US010817852B2

(12) United States Patent
Rangarajan et al.

(10) Patent No.: US 10,817,852 B2
(45) Date of Patent: Oct. 27, 2020

(54) SYSTEM FOR EXECUTING, SECURING, AND NON-REPUDIATION OF POOLED CONDITIONAL SMART CONTRACTS OVER DISTRIBUTED BLOCKCHAIN NETWORK

(71) Applicant: Bank of America Corporation, Charlotte, NC (US)

(72) Inventors: Prabakar Rangarajan, Chennai (IN); Awadhesh Pratap Singh, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 325 days.

(21) Appl. No.: 15/869,513

(22) Filed: Jan. 12, 2018

(65) Prior Publication Data

US 2019/0220831 A1 Jul. 18, 2019

(51) Int. Cl.
G06Q 20/00 (2012.01)
G06Q 20/06 (2012.01)
(Continued)

(52) U.S. Cl.
CPC ......... *G06Q 20/065* (2013.01); *G06Q 20/223* (2013.01); *G06Q 20/36* (2013.01); *G06Q 20/389* (2013.01); *H04L 9/0637* (2013.01); *H04L 9/0825* (2013.01); *H04L 9/0869* (2013.01); *H04L 9/3066* (2013.01); *H04L 9/3239* (2013.01); *H04L 9/3247* (2013.01); *H04L 67/104* (2013.01); *H04L 2209/38* (2013.01)

(58) Field of Classification Search
CPC .... G06Q 20/065; G06Q 20/223; G06Q 20/36; H04L 9/0637; H04L 9/0825; H04L 9/0869

USPC .......................................................... 705/50
See application file for complete search history.

(56) References Cited

U.S. PATENT DOCUMENTS 9,608,829 B2 3/2017 Spanos et al.
9,794,074 B2 10/2017 Toll et al.
(Continued)

FOREIGN PATENT DOCUMENTS

WO 2017090041 A1 6/2017
WO 2017098519 A1 6/2017
(Continued)

*Primary Examiner* — Patrick McAtee
*Assistant Examiner* — John M Winter
(74) *Attorney, Agent, or Firm* — Michael A. Springs; Moore & Van Allen PLLC; Nicholas C. Russell

(57) ABSTRACT

Embodiments of the present invention provide a system for executing, securing, and non-repudiation of pooled conditional smart contracts over a distributed blockchain network. In particular, the system may receive an instrument request from a beneficiary entity, where the instrument request includes an instrument amount. The system can then identify a lead contribution amount that a lead entity is willing to provide to meet a portion of the instrument amount. A set of supporting entities can be identified as willing to provide supporting contribution amounts to meet the remainder of the instrument amount. A conditional contract can be sent to each supporting entity that, when signed, authorizes the system to transfer contribution amounts, which may be in the form of cryptocurrency, from blockchain addresses of the lead and supporting entities to a blockchain address of the beneficiary entity. Once the instrument amount has been secured, the system executes the transactions.

15 Claims, 10 Drawing Sheets

(51) Int. Cl.
  *G06Q 20/36*   (2012.01)
  *H04L 29/08*   (2006.01)
  *H04L 9/08*    (2006.01)
  *H04L 9/30*    (2006.01)
  *H04L 9/06*    (2006.01)
  *G06Q 20/38*   (2012.01)
  *G06Q 20/22*   (2012.01)
  *H04L 9/32*    (2006.01)

(56) References Cited

U.S. PATENT DOCUMENTS

| | | |
|---|---|---|
| 2015/0379510 A1 | 12/2015 | Smith |
| 2016/0292672 A1 | 10/2016 | Fay et al. |
| 2016/0342976 A1 | 11/2016 | Davis |
| 2016/0342978 A1 | 11/2016 | Davis et al. |
| 2017/0005804 A1 | 1/2017 | Zinder |
| 2017/0132615 A1 | 5/2017 | Castinado et al. |
| 2017/0140408 A1 | 5/2017 | Wuehler |
| 2017/0155515 A1 | 6/2017 | Androulaki et al. |
| 2017/0237554 A1 | 8/2017 | Jacobs et al. |
| 2017/0243212 A1 | 8/2017 | Castinado et al. |
| 2017/0244757 A1 | 8/2017 | Castinado et al. |
| 2017/0279774 A1 | 9/2017 | Booz et al. |

FOREIGN PATENT DOCUMENTS

| | | |
|---|---|---|
| WO | 2017132641 A1 | 8/2017 |
| WO | 2017145019 A1 | 8/2017 |

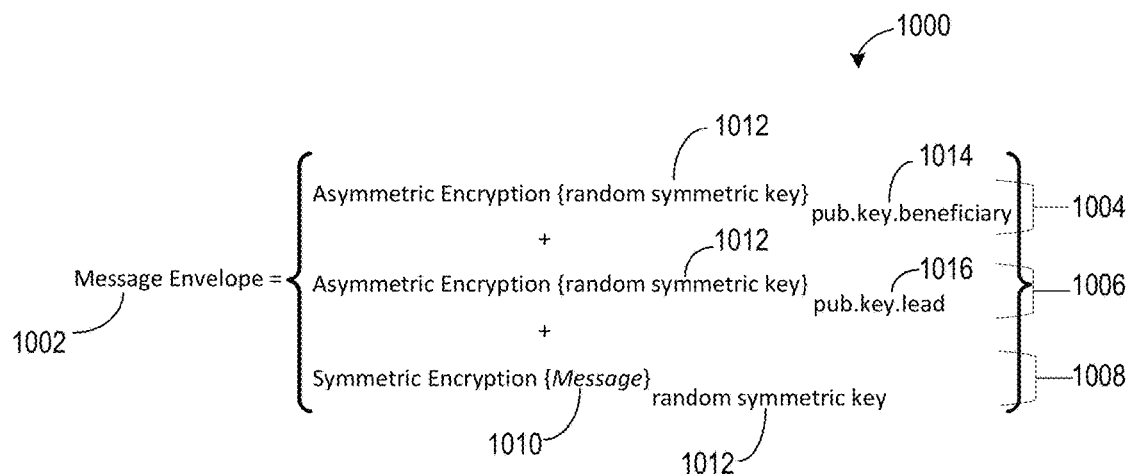

*Figure 10*

| Contribution Amount | Debit Address | Total Instrument Amount | Credit Address | Signed By | Settlement Amount [T + XX] |
|---|---|---|---|---|---|
| $X,XXX.XX | address1-lead_entity | $X,XXX.XX | address4-beneficiary_entity | XXXXXX | $X,XXX.XX |
| $X,XXX.XX | address2-supporting_entity_1 | $X,XXX.XX | address4-beneficiary_entity | XXXXXX | $X,XXX.XX |
| $XXX.XX | address3-supporting_entity_2 | $X,XXX.XX | address4-beneficiary_entity | XXXXXX | $XXX.XX |

*Figure 11*

SYSTEM FOR EXECUTING, SECURING, AND NON-REPUDIATION OF POOLED CONDITIONAL SMART CONTRACTS OVER DISTRIBUTED BLOCKCHAIN NETWORK

BACKGROUND

Backing beneficiary entities through the generation and execution of requested instruments is an important operational aspect of certain lead entities. Traditionally, the backing process requires a lead entity to act in a centralized capacity to facilitate messaging procedures, contribution generation procedures, contribution or reconciliation procedures, and settlement procedures. Thus, such a lead entity is burdened with maintaining the procedures and related records from interactions with a plurality of distinct parties. The traditional model of backing beneficiary entities can be improved to reduce the processing requirements and time requirements of a lead entity system by addressing certain automation, communication, authentication, complexity concerns.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for executing, securing, and non-repudiation of pooled conditional smart contracts over a distributed blockchain network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer-readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving an instrument request comprising an instrument amount from a beneficiary entity and identifying a lead contribution amount that a lead entity is willing to provide to meet the instrument amount. The system may then identify a set of supporting entities that are willing to provide supporting contribution amounts to meet the instrument amount, wherein the set of supporting entities comprises at least a first supporting entity willing to provide a first supporting contribution amount, and a second supporting entity willing to provide a second supporting contribution amount. Next, in some embodiments, the system may transmit a conditional contract to the first supporting entity, wherein the conditional contract permits the lead entity to transfer the first supporting contribution amount from a digital wallet blockchain address of the first supporting entity to a digital wallet blockchain address of the beneficiary entity only if the lead contribution amount and the supporting contribution amounts meet the instrument amount, and only after being signed by the first supporting entity. Furthermore, the system may be configured to receive a digital signature of the first supporting entity for the conditional contract transmitted to the first supporting entity. The system may then transmit a conditional contract to the second supporting entity, wherein the conditional contract permits the lead entity to transfer the second supporting contribution amount from a digital wallet blockchain address of the second supporting entity to the digital wallet blockchain address of the beneficiary entity only if the lead contribution amount and the supporting contribution amounts meet the instrument amount, and only after being signed by the second supporting entity. Once the system receives a digital signature of the second supporting entity for the conditional contract transmitted to the second supporting entity, the system can determine that the instrument amount has been met by determining that a combination of the lead contribution amount, the first supporting contribution amount, and the second supporting contribution amount meet the instrument amount. Finally, in response to (a) determining that the instrument amount has been met, (b) receiving the digital signature of the first supporting entity, and (c) receiving the digital signature of the second supporting entity, the system may transfer (x) the lead contribution amount from a digital wallet blockchain address of the lead entity to the digital wallet blockchain address of the beneficiary entity, (y) the first supporting contribution amount from the digital wallet blockchain address of the first supporting entity to the digital wallet blockchain address of the beneficiary entity, and (z) the second supporting contribution amount from the digital wallet blockchain address of the second supporting entity to the digital wallet blockchain address of the beneficiary entity.

In some embodiments, the system may be further configured to subsequently receive an offer of a settlement amount from the beneficiary entity. Once the offer of the settlement amount has been received, the system may transmit a lead portion of the settlement amount from the digital wallet blockchain address of the beneficiary entity to the digital wallet blockchain address of the lead entity. Additionally, the system may transmit a first supporting portion of the settlement amount from the digital wallet blockchain address of the beneficiary entity to the digital wallet blockchain address of the first supporting entity. Furthermore, the system may transmit a second supporting portion of the settlement amount from the digital wallet blockchain address of the beneficiary entity to the digital wallet blockchain address of the second supporting entity. Of course, the system may transmit any number of settlement portions to any number of entities, based on the conditional contracts.

For some embodiments of the system, the first supporting contribution amount, or the second supporting contribution amount comprise a currency-backed cryptocurrency amount.

The step of receiving the instrument request may, in some embodiments, comprise providing a multi-lateral private messaging system for communication between the lead entity and the beneficiary entity. This messaging on the multi-lateral private messaging system may comprise generating a random symmetric key, encrypting a message using the random symmetric key, encrypting the random symmetric key using a public key of the lead entity, encrypting the random symmetric key using a public key of the beneficiary entity, and packaging the random symmetric key-encrypted message, the public key of the lead entity-encrypted random symmetric key, and the public key of the beneficiary entity-encrypted random symmetric key into a message envelope. The system can then publish the packaged envelope to a blockchain network. The system can include the step of receive the instrument request as the message via the multilateral private messaging system.

In some embodiments, the system may further be configured to generate the digital wallet blockchain address of the first supporting entity by performing the steps of: generating a key pair of public address generation information and of a private master seed key using an elliptic curve digital signature algorithm; identifying a customer identification number associated with the first supporting entity; generating a unique individual private key for the first supporting entity by combining the private master seed key with the customer identification number associated with the first supporting entity; and generating the digital wallet blockchain address of the first supporting entity by combining the public address generation information with the customer identification number associated with the first supporting entity.

Additionally, the step of identifying a set of supporting entities that are willing to provide supporting contribution amounts to meet the instrument request further comprises comparing a set of components of the instrument request to a database of previous instrument request components and associated supporting entities using a machine learning algorithm, wherein the previous set of components comprises tenures of previously requested instruments, instrument amounts of the previously requested instruments, time of year of the previously requested instruments, names of beneficiary entities associated with the previously requested instruments, beneficiary entity types associated with the previously requested instruments, or settlement rates associated with the previously requested instruments.

Finally, in some embodiments, the system may further be configured to generate a digital fingerprint of the conditional contract transmitted to the first supporting entity and publish the digital fingerprint of the conditional contract transmitted to the first supporting entity to a blockchain network. The system may subsequently receive a notification of a repudiation of a document purporting to be the conditional contract transmitted to the first supporting entity. The system can then generate a digital fingerprint of the document purporting to be the conditional contract transmitted to the first supporting entity and compare the digital fingerprint of the document purporting to be the conditional contract transmitted to the first supporting entity to the digital fingerprint of the conditional contract transmitted to the first supporting entity to a blockchain network that is published to the blockchain network. In response to determining that the comparison does not match, the system may reject the document purporting to be the conditional contract transmitted to the first supporting entity. Alternatively, in response to determining that the comparison does match, the system may verify the document purporting to be the conditional contract transmitted to the first supporting entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
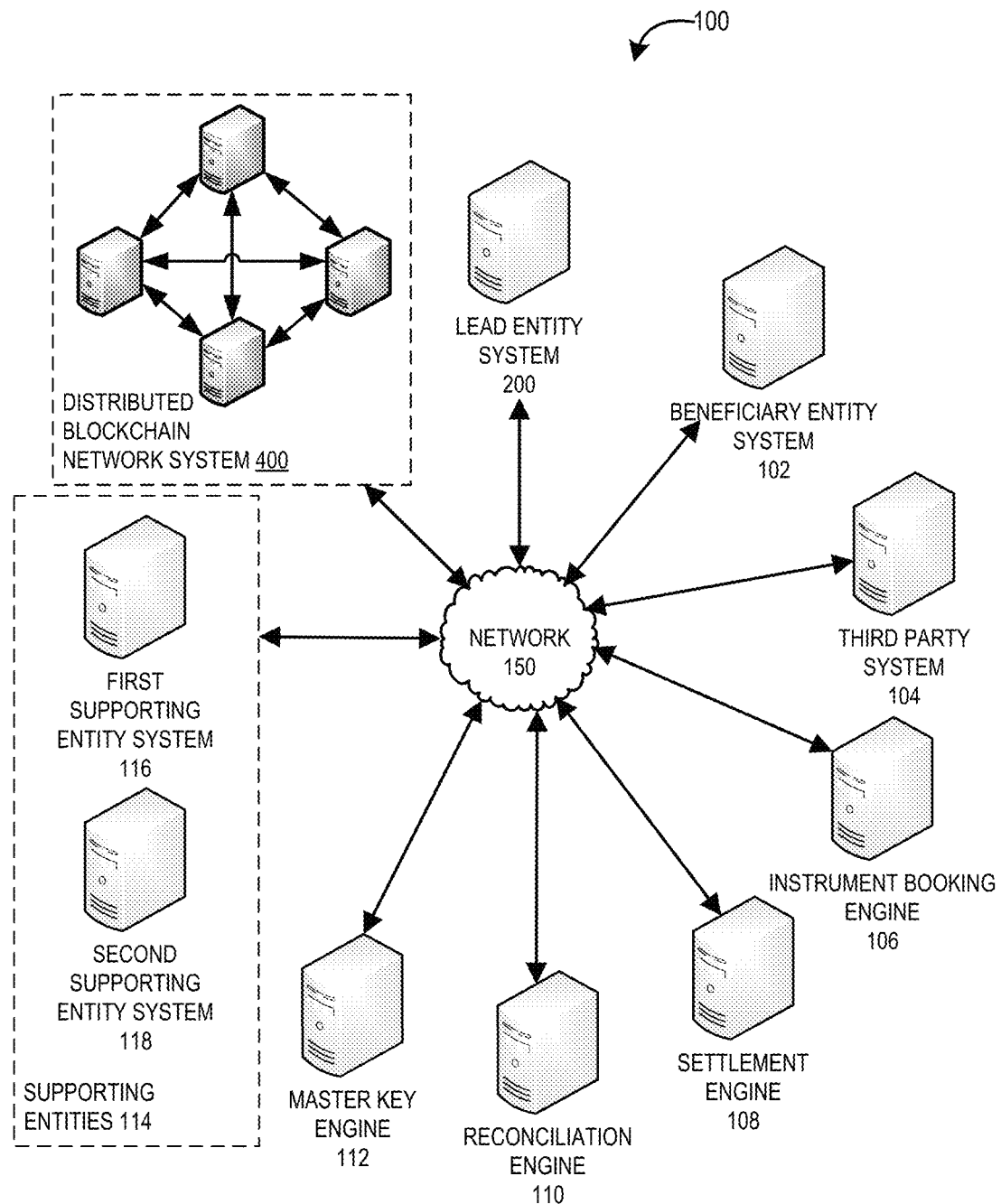
Figure 2:
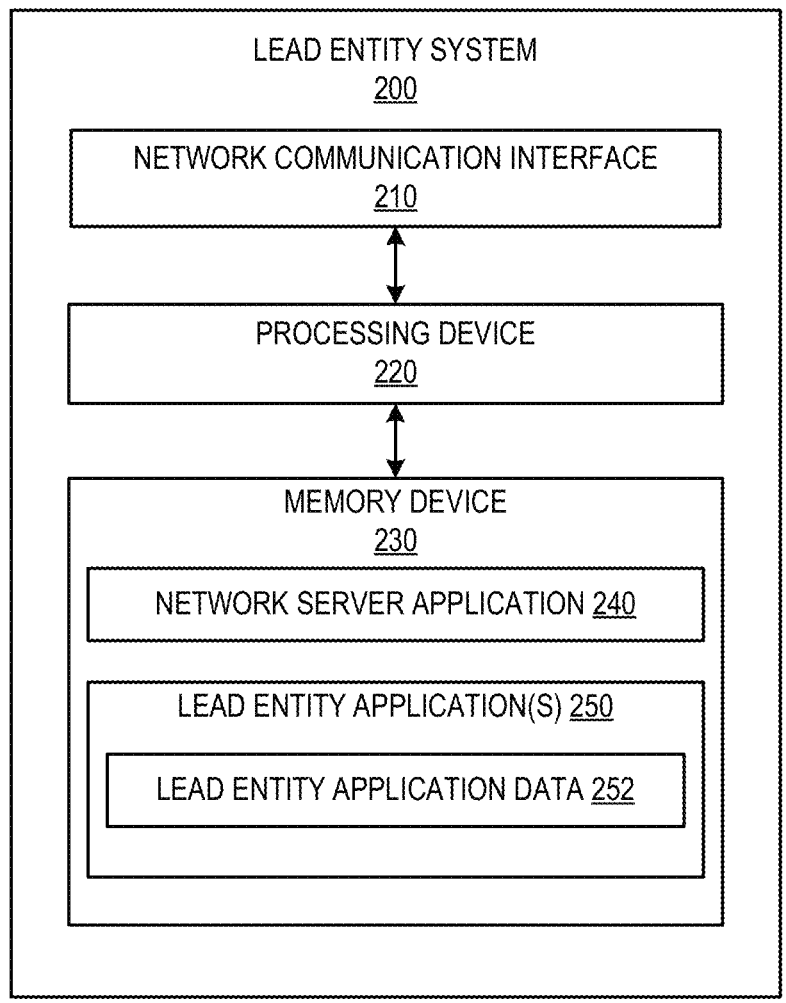
Figure 3:
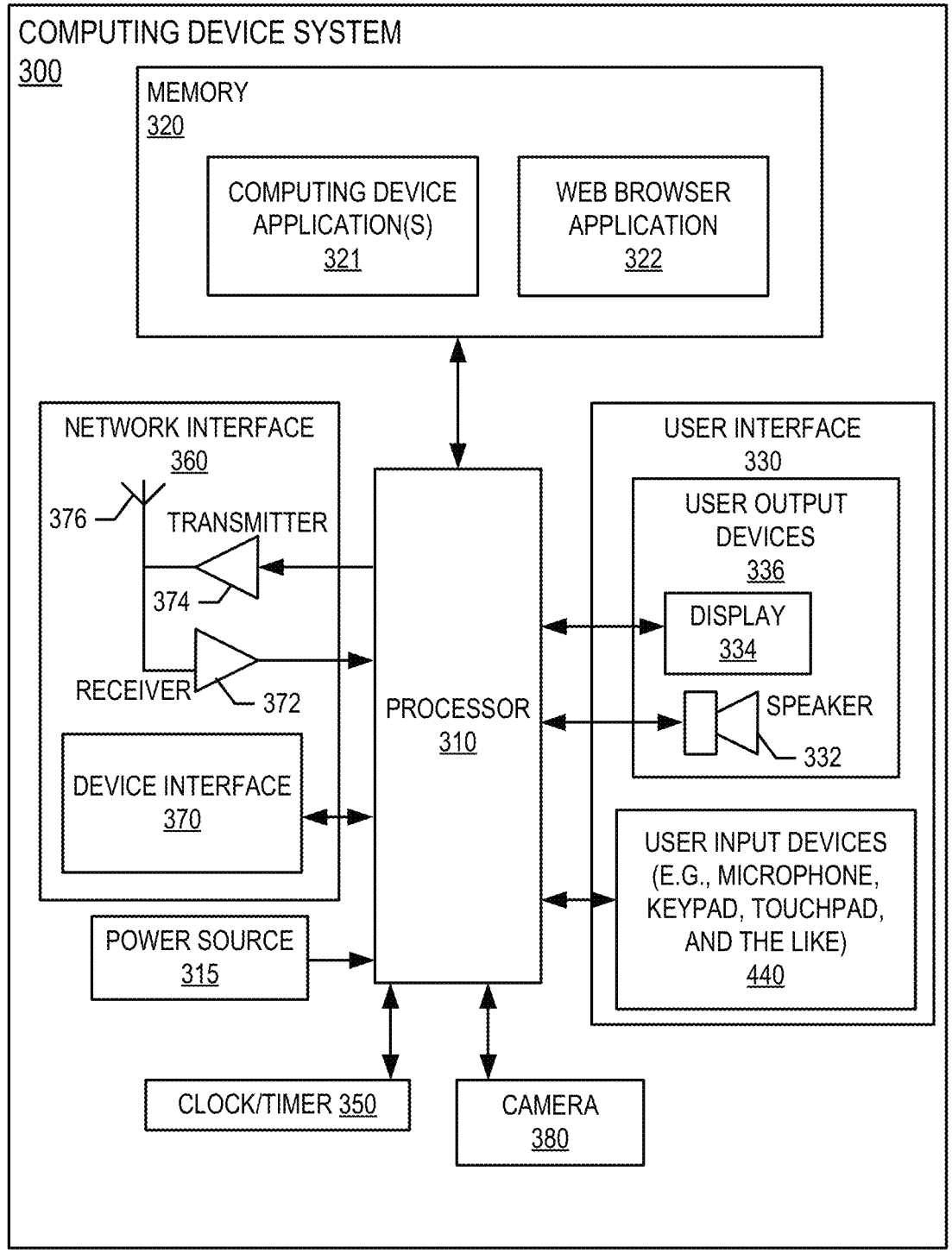
Figure 4A:
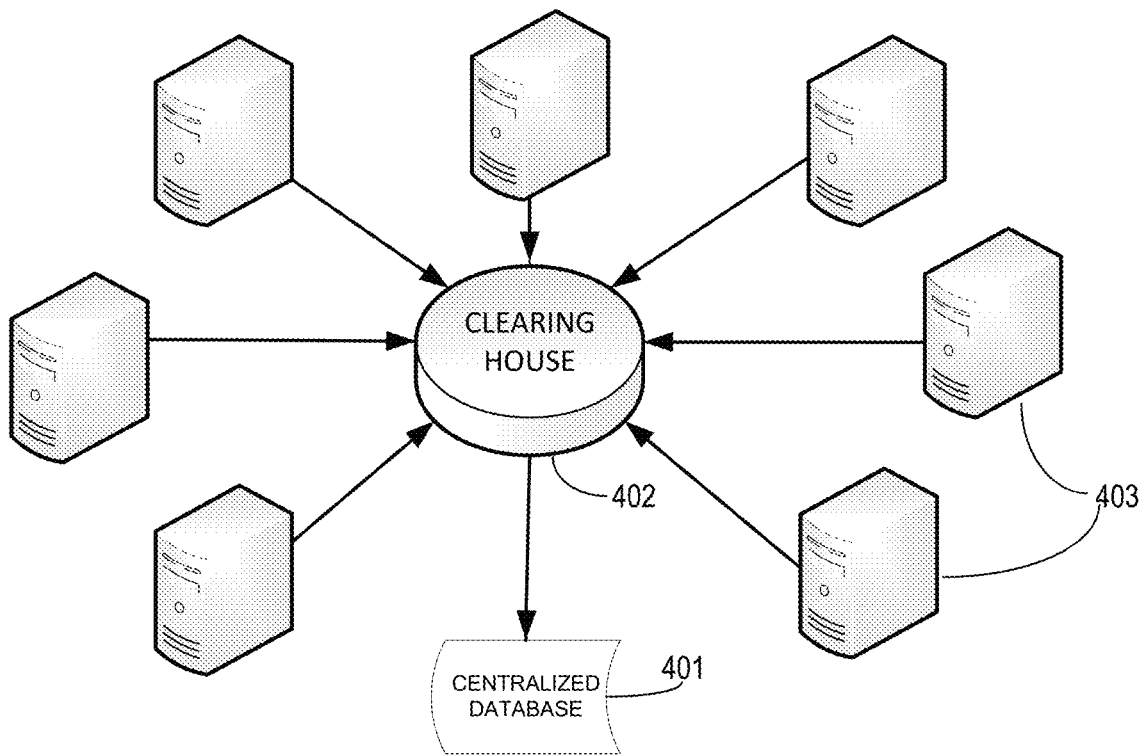
Figure 4B:
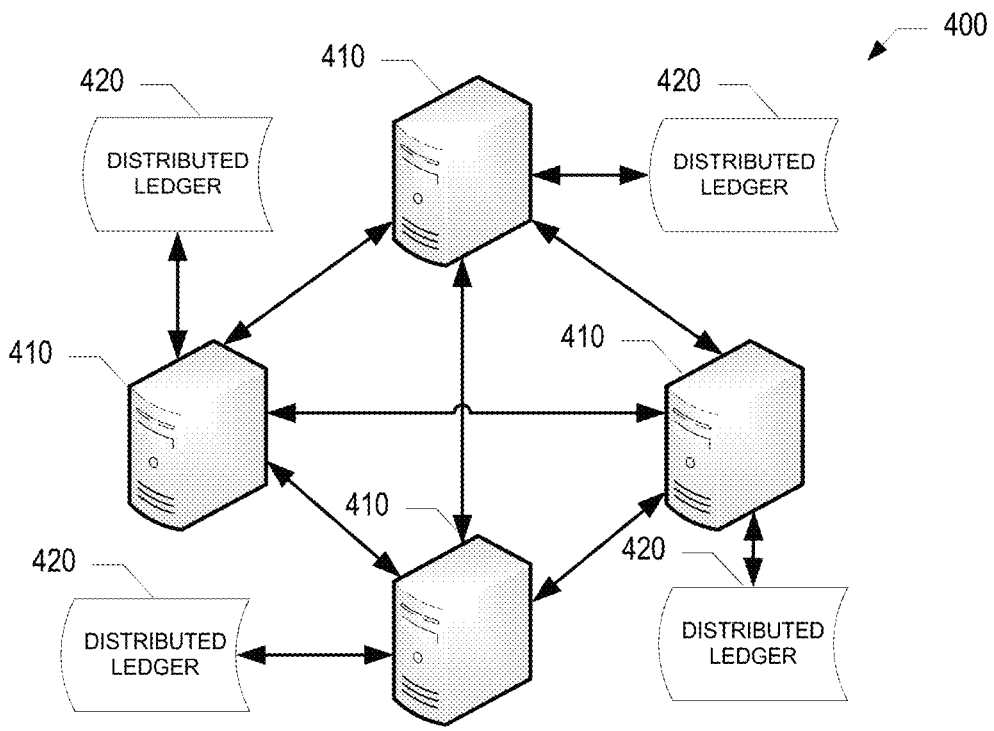
Figure 5:
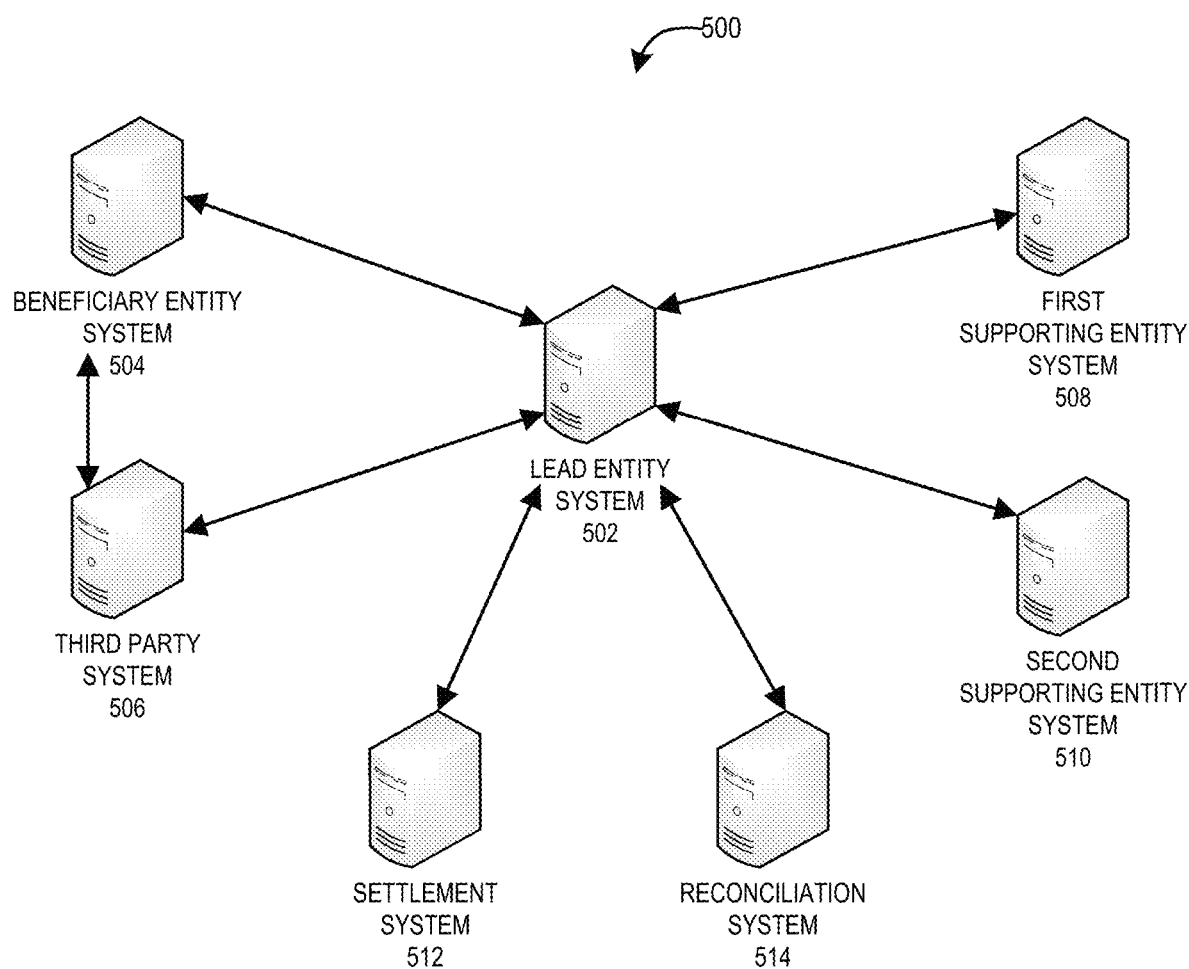
Figure 6:
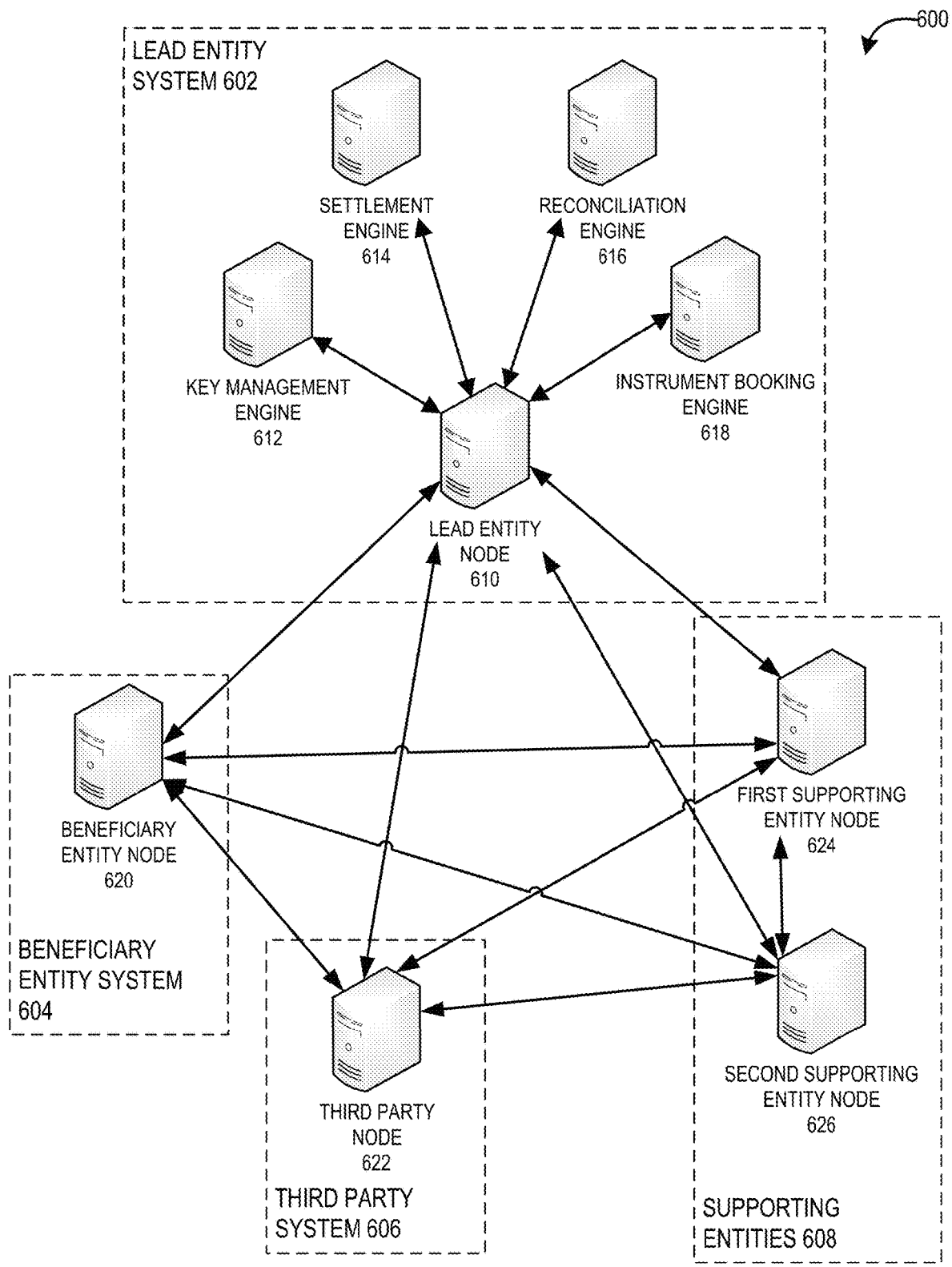
Figure 7:
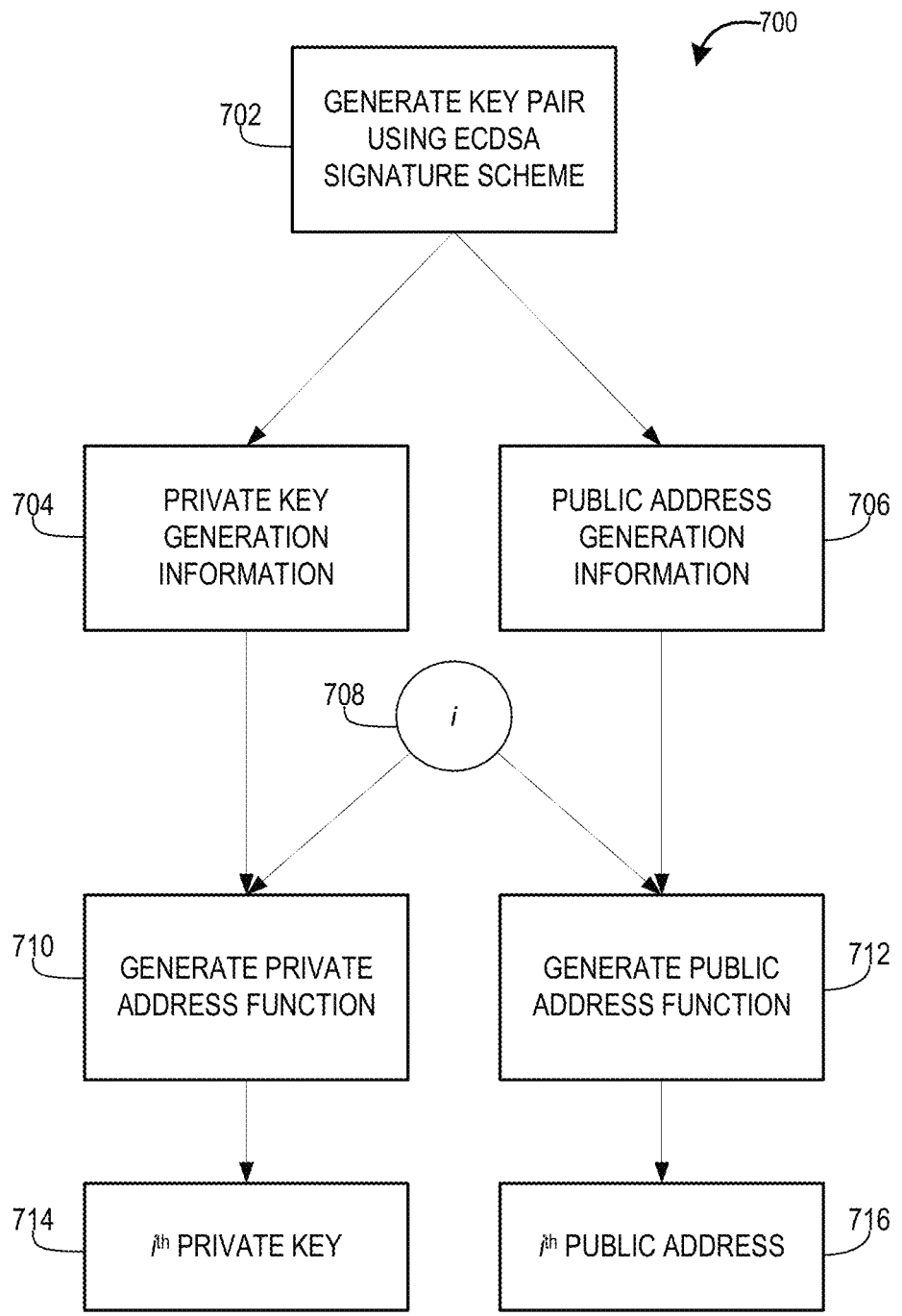
Figure 8:
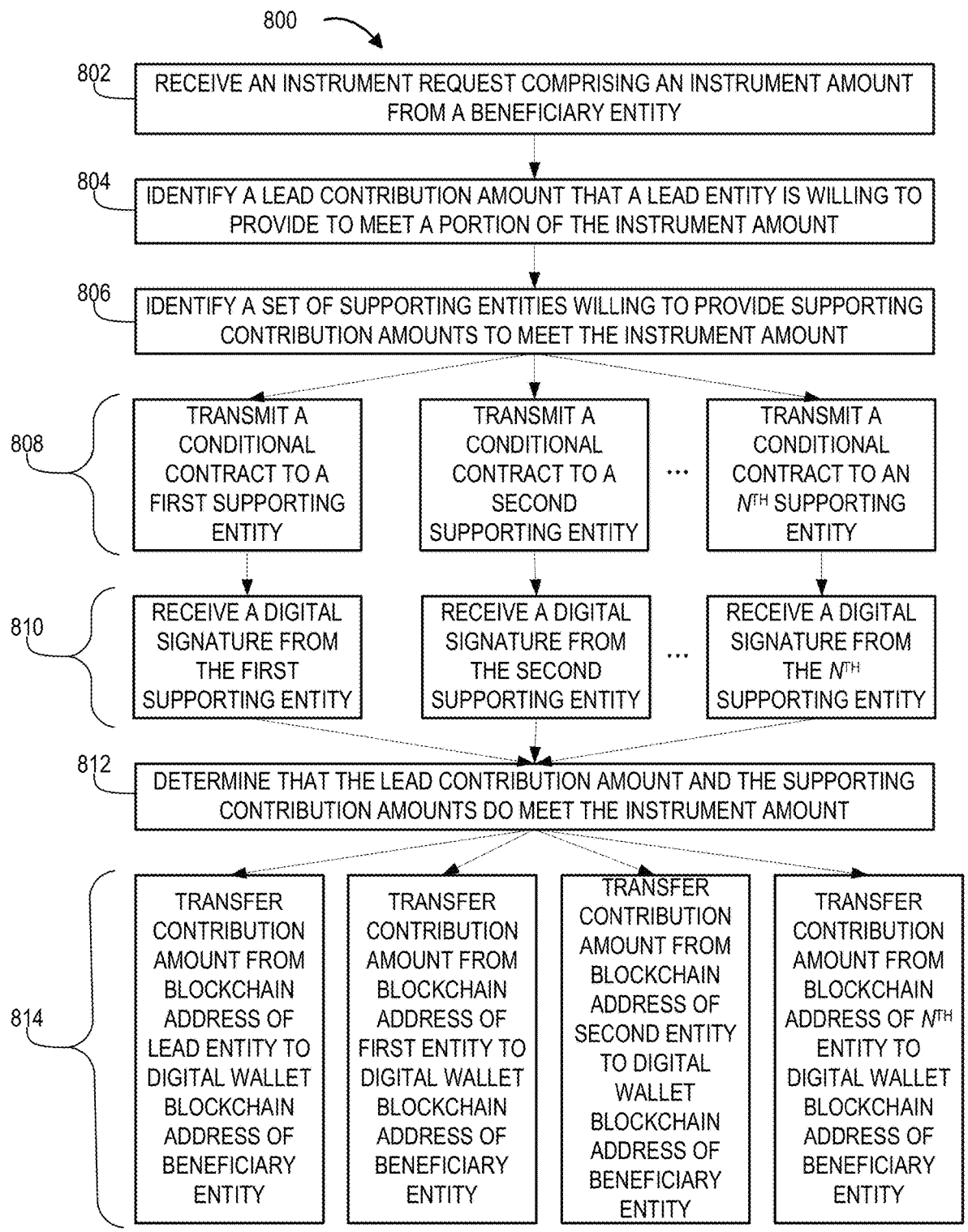
Figure 9:
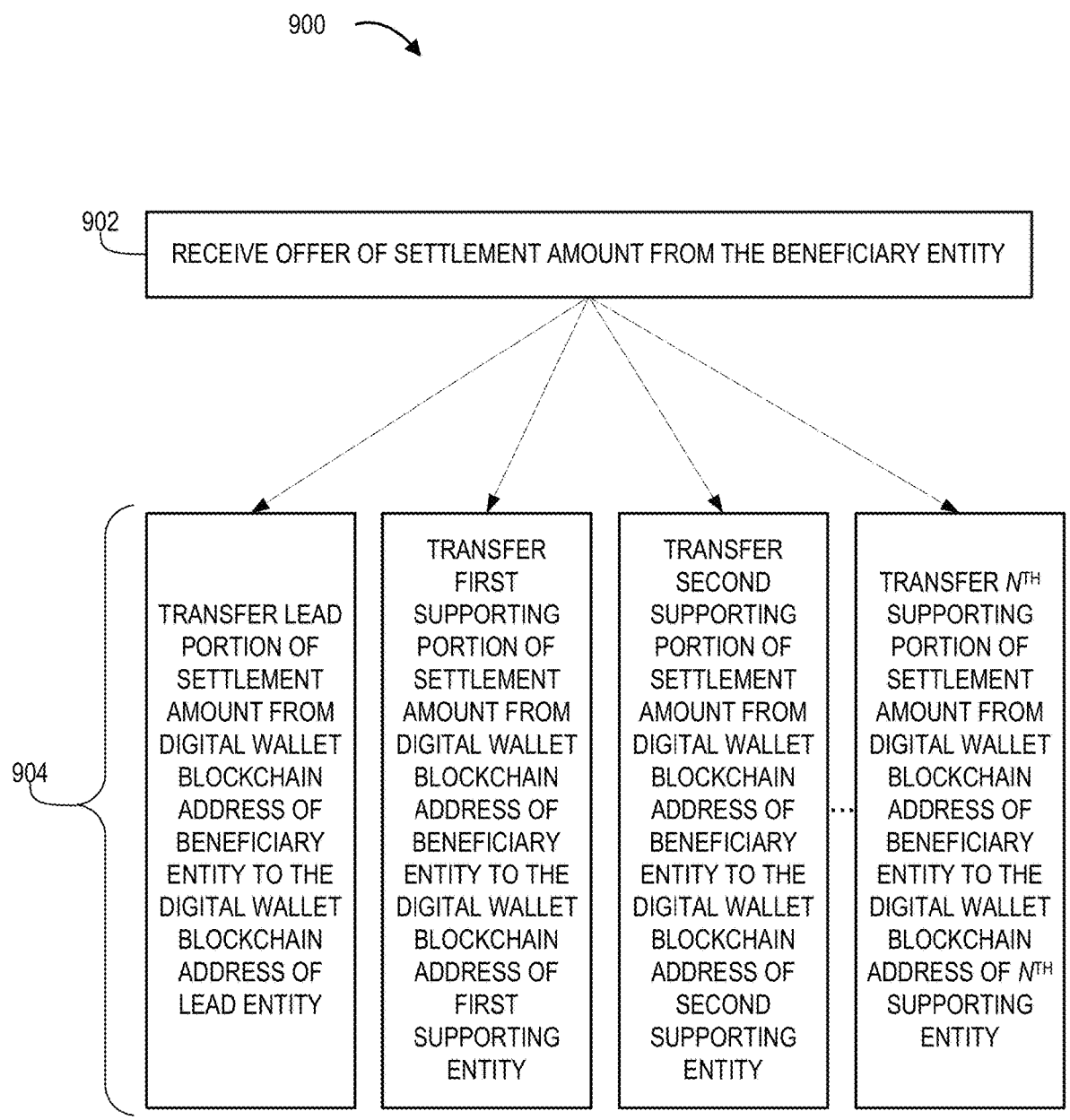

Having thus described embodiments of the invention in general terms, reference will now be made the accompanying drawings, wherein:

FIG. 1 provides a block diagram illustrating a system environment for transferring portions of a settlement amount from a beneficiary entity to a plurality of contributing entities over a distributed blockchain network, in accordance with an embodiment of the invention;

FIG. 2 provides a block diagram illustrating the lead entity system of FIG. 1, in accordance with an embodiment of the invention;

FIG. 3 provides a block diagram illustrating a computing device system, in accordance with an embodiment of the invention;

FIG. 4A provides a block diagram illustrating a clearing house system;

FIG. 4B provides a block diagram illustrating a decentralized blockchain configuration architecture, in accordance with an embodiment of the invention;

FIG. 5 provides a block diagram illustrating a system environment that has been used in the past;

FIG. 6 provides a block diagram illustrating a system environment designed to reduce a centralized nature of a role that a lead entity plays, in accordance with embodiments of the invention;

FIG. 7 provides a flowchart illustrating a process for generating a series of keys using a single seed or master key, in accordance with embodiments of the invention;

FIG. 8 provides a flowchart illustrating a process for executing, securing, and non-repudiation of pooled conditional smart contracts over a distributed blockchain network, in accordance with embodiments of the invention;

FIG. 9 provides a flowchart illustrating a process for transferring portions of a settlement amount from a beneficiary entity to a plurality of contributing entities over a distributed blockchain network, in accordance with embodiments of the invention;

FIG. 10 provides a block diagram that illustrates a message envelope configuration, in accordance with embodiments of the invention; and FIG. 11 provides a sample table that is publishable to a blockchain network to describe the execution of a pooled conditional contract among multiple parties, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for executing, securing, and non-repudiation of pooled conditional smart contracts over a distributed blockchain network. Generally, this invention can be used by a system associated with a lead entity like a financial institution that receives a request for a financial instrument like a business loan from a beneficiary entity.

For example, the beneficiary entity maybe an exporter that is doing business with an importer, where the exporter needs additional funds (i.e., the amount of the financial instrument) to cover an expected delay in receiving the completed payment of the commercial transaction from the importer to the exporter. Instead of waiting for the importer to make the payment, the exporter may request a financial instrument from the lead entity to finance the transaction until the importer completes the payment, which normally occurs after a period of weeks or months (e.g., two months, three months, or the like). The lead entity, as a financial institution, is willing to provide a financial instrument of a loan to the exporter, where the exporter will repay the loan with an additional amount based on an interest rate, and administrative amount or another additional amount that is set by the lead entity. The repayment amount can be considered a settlement amount.

These commercial financing interactions generally involve a large amount of funds, so the lead entity often desires to distribute the contribution obligations (and expected settlement amount) across multiple additional entities, referred to as supporting entities. In the past, the lead entity has had to operate as a centralized figure or middleman between the exporter (i.e., the beneficiary entity), the importer, each supporting entity, and any engines or financial account systems it uses to facilitate the generation and execution of the financial instrument. As described herein, the proposed system is now configured to utilize blockchain technology to address concerns related to communication, authentication, contract verification and validation, complexity issues, time value of money issues, timing or duration issues, and the like.

As such, the new system is configured to receive the financial instrument request from the beneficiary entity (e.g., an exporter), where the financial instrument request includes an instrument amount (e.g., a loan amount). This financial instrument request may be received through a multi-lateral private messaging system that packages and publishes messages to the blockchain network such that only those entities with the appropriate public keys are able to unpack and read the messages. Once the financial instrument request has been received, the system may identify a lead contribution amount that a lead entity (e.g., a managing financial institution) is willing to provide to meet a portion of the instrument amount. The system can then identify a set of supporting entities that are willing to provide supporting contribution amounts to meet the instrument amount, thereby spreading the contribution burden across the lead entity and each supporting entity. The supporting entities may be identified using machine learning algorithms that compare criteria of the received financial instrument request to criteria of historical or previous transaction requests.

Once the supporting entities have been identified, the system transmits a conditional contract to each supporting entity, where the conditional contract is an agreement by the supporting entity to provide their supporting contribution amount to the beneficiary entity in the event enough funds are collected to meet the instrument amount. A fingerprint or hash of each conditional contract can be generated and stored to a blockchain network for non-repudiation purposes. The supporting entities can agree to the conditional contract by providing a digital signature that can be confirmed by an automated process of the system, avoiding the need for human analysis and signature verification.

Once the system has received the digital signatures and determined that the lead contribution amount and the supporting contribution amounts do meet the requested instrument amount, the system will transfer each respective contribution amount from digital wallet blockchain addresses of the lead entity and each supporting entity, respectively, to a digital wallet blockchain address of the beneficiary entity. This transfer can be completed using cryptocurrency and/or currency-backed cryptocurrency. A table representing the pooled transaction, as contracted, can be published to the blockchain.

Once the beneficiary entity is ready to repay the financial instrument, the beneficiary entity can transmit an offer of a settlement amount to the system. Once the system receives this offer of the settlement amount, the system can divide the settlement amount up amongst the lead entity and the supporting entities based on contribution amounts and other previously-agreed upon factors like interest rates for each portion of the contribution. The system can then transfer each divided up portion of the settlement amount from the digital wallet blockchain address of the beneficiary entity to the digital wallet blockchain addresses of the respective contributing entities (i.e., the lead entity and the supporting entities).

By providing an automated mechanism for effectively exchanging contractual information to multiple other financial institutions and entities (e.g., the multi-lateral private messaging system), the system is resolving communication issues of the traditional processes. By automatically verifying digital signatures of contracts, the system is resolving authentication and verification issues of traditional processes of requiring manual verification of signatures. By pooling the contracts of all supporting entities and only transferring funds in response to a triggering event for all contribution amounts, the system resolves complexity issues associated with receiving separate contribution amounts at different times, before it is known whether enough funds will be raised to meet the financial instrument request, and the like. Additionally, this streamlined process administrative costs and can be executed automatically, allowing the entire process to be completed in a matter of minutes or hours instead of a matter of days.

FIG. 1 provides a block diagram illustrating a system environment 100 for executing, securing, and non-repudiation of pooled conditional smart contracts over a distributed blockchain network, in accordance with an embodiment of the invention. As illustrated in FIG. 1, the environment 100 includes a lead entity system 200, a distributed blockchain network system 400, a beneficiary system 102, a third party system 104, an instrument booking engine 106, a settlement engine 108, a reconciliation engine 110, a master key engine 112, and supporting entities 114 comprising at least a first supporting entity system 116, possibly a second supporting entity system 118, and/or one or more additional supporting entity systems (not shown). One or more users may be included in the system environment 100. In some embodiments, the user(s) of the system environment 100 may be employees of the lead entity, beneficiary entity, third party entity, first supporting entity, second supporting entity, or the like. These users may interact with their respective systems through a user interface of a computing device system, like the computing device system 300 described in FIG. 3.

The lead entity system 200, the distributed blockchain network system 400, the beneficiary entity system 102, third party system 104, instrument booking engine 106, settlement engine 108, reconciliation engine 110, master key engine 112, first supporting entity system 116, and second supporting entity system 118 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The lead entity system 200 may be a system owned or otherwise controlled by a lead entity to perform one or more process steps described herein. For example, the lead entity may be an organization that is set up to manage messaging networks, digital pooled conditional contract systems, data storage and security systems, transaction execution systems, instrument (e.g., financial instrument) execution systems, and the like. In some embodiments, the lead entity is a financial institution. In general, the lead entity system 200 is configured to communicate information or instructions with the distributed blockchain network system 400, the beneficiary entity system 102, third party system 104, instrument booking engine 106, settlement engine 108, reconciliation engine 110, master key engine 112, first supporting entity system 116, and second supporting entity system 118 across the network 150.

For example, the lead entity system 200 may be configured to manage, access, write to, otherwise manipulate or engage with the distributed blockchain network system 400. Additionally or alternatively, the lead entity system 200 may be configured to provide and engage in a multi-lateral private messaging system to and with the beneficiary entity system 102, the third party system 104, or other systems over the distributed blockchain network system 400. Furthermore, the lead entity system 200 may be configured to request contribution amounts from the supporting entities 114 and transfer amounts (e.g., funds) from one digital blockchain wallet address to another digital blockchain wallet address.

In some embodiments, the lead entity system 200 may be configured to cause the instrument booking engine 106 to perform certain tasks related to identifying and/or requesting contribution amounts from the supporting entities 114. The lead entity system 200 may also be configured to cause the settlement engine 108 to transfer portions of a settlement offer from a digital blockchain wallet address of one entity to digital blockchain wallet addresses of other entities.

Additionally, the lead entity system 200 may cause the reconciliation engine 110 to compare contribution amounts to an instrument amount and/or transfer contribution amounts from digital blockchain wallet addresses of one or more entities to a digital blockchain wallet address of another entity. Furthermore, the lead entity system may cause the master key engine 112 to generate a new digital blockchain wallet address for a new entity. Of course, the lead entity system 200 may be configured to perform (or instruct other systems to perform) one or more other process steps described herein. The lead entity system 200 is described in more detail with respect to FIG. 2.

The distributed blockchain network system 400 may be a distributed database that maintains a list of data records, the security of which is enhanced by the distributed nature of multiple blockchain nodes. These nodes may be one or more systems, machines, computers, databases, data stores, or the like that are operably connected with one another. Each of the multiple nodes may be owned, managed, or otherwise maintained by distinct entities, although a single entity can maintain multiple nodes, or multiple entities may have at least some ownership or ability to maintain a single node. The distributed blockchain network system 400 is described in more detail with respect to FIG. 4.

The beneficiary entity system 102 may be a system owned or controlled by a beneficiary entity that specializes in requesting instruments (e.g., a financial instrument) via a multi-lateral private messaging system, receiving contribution amounts, and returning settlement offer amounts. In general, the beneficiary entity system 102 is configured to communicate information or instructions with the lead entity system 200, the distributed blockchain network system 400, the third party system 104, the instrument booking engine 106, the settlement engine 108, the reconciliation engine 110, the master key engine 112, and/or the supporting entities 114, across the network 150. For example, the beneficiary entity system 102 may be configured to transmit a request for an instrument, including an instrument amount, to the lead entity system 200. The beneficiary entity system 102 may, in some embodiments, maintain one or more nodes of the distributed blockchain network system 400, such that information, transactions, and/or cryptocurrencies associated with the beneficiary entity system 102 can be stored, recorded, transferred, and the like on the distributed ledgers of the blockchain network system 400. Of course, the beneficiary entity system 102 may be configured to perform (or instruct other systems to perform) one or more other process steps described herein.

The third party system 104 may be one or more a systems owned or controlled by entities other than those noted in the system environment 100. In general, the third party system 104 is configured to communicate information or instructions with the lead entity system 200, the distributed blockchain network system 400, the beneficiary entity system 102, the instrument booking engine 106, the settlement engine 108, the reconciliation engine 110, the master key engine 112, and/or the supporting entities 114, across the network 150. In one embodiment the third party entity may be an importer, purchaser, or other entity with a direct relationship with the beneficiary entity. In such embodiments, the third party entity, via the third party entity system 104, may be configured to message with the beneficiary entity system 102, the lead entity system 200, and/or the distributed blockchain network system 400 to aid the beneficiary entity in obtaining its requested instrument. For example, the third party entity may be an entity that desires to purchase products from the beneficiary entity, and therefore is willing to communicate with the lead entity system 200 and/or the distributed blockchain network 400 to verify that the beneficiary entity has a purchase order in place and any requested instrument (e.g., a financial instrument such as a business loan) is for the particular purpose of helping the beneficiary entity fulfill the third party entity's purchase order. In other embodiments, the third party system 104 may be associated with a third party entity that specializes in maintaining one or more nodes of the distributed blockchain network 400 and therefore plays a part in any actions that require manipulation of the distributed blockchain network system 400. Of course, the third party system may be configured to perform (or instruct other systems to perform) one or more other process steps described herein.

The instrument booking engine 106 may be an engine owned or controlled by the lead entity and/or a third party that specializes in matching instrument requests with one or more supporting entities, based on certain characteristics or features of the requested instrument and the involved parties. In some embodiments, at least a portion of the instrument booking engine 106 is a component of the lead entity system 200. In other embodiments, the instrument booking engine is a separate engine or system that can be instructed by the lead entity system 200 or another system to perform one or more of the steps described herein. In general, the instrument booking engine 106 is configured to communicate information or instructions with the lead entity system 200, the distributed blockchain network system 400, the beneficiary entity system 102, the third party system 104, the settlement engine 108, the reconciliation engine 110, the master key engine 112, and/or the supporting entities 114, across the network 150. For example, the lead entity system 200 may instruct or otherwise cause the instrument booking engine 106 to identify the supporting entities 114 that could be involved with a requested instrument. The instrument booking engine 106 may comprise a database of historical data associated with previous instrument requests, including certain criteria of each previous instrument request that may correlate with which entities should be chosen as supporting entities 114, how much each potential supporting entity should contribute, and the like. As such, the instrument booking engine 106 may comprise machine learning algorithms configured to compare a newly received transaction request to the historical data associated with the previous instrument requests to better identify potential supporting entities 114 for a newly requested instrument, and the like. Of course, the instrument booking engine 106 may be configured to perform (or instruct other systems to perform) one or more other process steps described herein.

The settlement engine 108 may be an engine owned or controlled by the lead entity of the lead entity system 200 and/or a third party that specializes in managing, calculating, or otherwise determining settlement amounts, settlement transaction steps, and the like for the repayment of an instrument from the beneficiary entity system 102 to the lead entity system 200 and/or the supporting entities 114. In some embodiments, at least a portion of the settlement engine 108 may be a component of the lead entity system 200. In other embodiments, the settlement engine 108 is separate from the lead entity system 200 but is configured to receive instructions from the lead entity system 200 to cause the settlement engine 108 to perform one or more tasks described herein. In general, the settlement engine 108 is configured to communicate information or instructions with the lead entity system 200, the distributed blockchain network system 400, the beneficiary entity system 102, the third party system 104, the instrument booking engine 106, the reconciliation engine 110, the master key engine 112, and/or the supporting entities 114, across the network 150. For example, the settlement engine 108 may be configured to receive an indication from the beneficiary entity system 102 of an offer of a settlement amount that is associated with contribution amounts to a requested instrument from the lead entity system 200, the first supporting entity system 116, and the second supporting entity system 118. The settlement engine 108 may then determine portions of the settlement amount for each contributing entity (e.g., an amount proportional to the contribution amount of each supporting or lead entity, a previously agreed to amount for each of the lead and supporting entities, or the like) and effectuate the transfer of each portion of the settlement amount from the digital blockchain wallet of the beneficiary entity system 102 to respective digital blockchain wallets of the contributing entities. Of course, the settlement engine 108 may be configured to perform (or instruct other systems to perform) one or more other process steps described herein.

The reconciliation engine 110 may be an engine owned or controlled by the lead entity of the lead entity system 200 and/or a third party that specializes in returning contribution amounts or transmitting reports of an unsuccessful instrument contribution to supporting entities after an instrument request is not met. In some embodiments, at least a portion of the reconciliation engine 110 is a component of the lead entity system 200. In other embodiments, the reconciliation engine 110 is a separate system that is configured to receive instructions from the lead entity system 200 to cause the reconciliation engine 110 to perform one or more tasks described herein. In general, the reconciliation engine 110 is configured to communicate information or instructions with the lead entity system 200, the distributed blockchain network system 400, the third party system 104, the instrument booking engine 106, of with the supporting entities 114, across the network 150.

The master key engine 112 may be an engine owned or controlled by the lead entity of the lead entity system 200 and/or a third party that specializes in generating and maintaining private keys and public blockchain addresses for a large number of distinct entities. In general, the master key engine 112 is configured to communicate information or instructions with the lead entity system 200, the distributed blockchain network system 400, the beneficiary entity system 102, and/or with the supporting entities 114, across the network 150. For example, the master key engine 112 may receive instructions from the lead entity system 200 to generate a new unique private blockchain key and public blockchain address for the first supporting entity system 116 based on a particular identifier of the first supporting entity associated with the first supporting entity system 116. The master key engine 116 may then generate the new unique private key for the first supporting entity system and provide it to the lead entity system and generate the new unique public blockchain address for the first supporting entity and provide that public blockchain address to both the first supporting entity system 116 and the lead entity system 200. Of course, the master key engine 112 may be configured to perform (or instruct other systems to perform) one or more other process steps described herein.

The supporting entities 114 may comprise one or more systems associated supporting entities, where supporting entities are entities that are willing to contribute certain amounts to meet an instrument request, thereby spreading the contribution obligations across the lead entity and the other supporting entities 114. Each supporting entity (e.g., the first supporting entity system 116 and the second supporting entity system 118) may be associated with their own distinct node within the distributed blockchain network system 400. Additionally or alternatively, each distinct supporting entity is associated with its own public blockchain address for the distributed blockchain network system 400, as may be determined by the master key engine 112.

In general, the supporting entities are configured to communicate information or instructions with the lead entity system 200, the distributed blockchain network system 400, the beneficiary entity system 102, the third party system 104, and/or the instrument booking engine 106, across the network 150. For example, the first supporting entity system 116 may receive a request and/or a conditional contract to supply a particular supporting amount that would make up a portion of a transaction amount of a transaction requested by the beneficiary entity system 102. The first supporting entity system 116 may be configured to input a digital signature to the conditional contract (e.g., at the direction of an authorized user), to indicate that the first supporting entity is prepared and willing to provide a first supporting amount to the requested instrument amount in the event the lead entity system 200 is able to raise the rest of the funds necessary to meet the total requested instrument amount. Of course, the systems of the supporting entities 114 may be configured to perform (or instruct other systems to perform) one or more other process steps described herein.

FIG. 2 provides a block diagram illustrating the lead entity system 200, in accordance with embodiments of the invention. As illustrated in FIG. 2, in one embodiment of the invention, the lead entity system 200 includes one or more processing devices 220 operatively coupled to a network communication interface 210 and a memory device 230. In certain embodiments, the lead entity system 200 is operated by a lead entity, such as a financial institution, while in other embodiments, the lead entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the lead entity system 200 described herein. For example, in one embodiment of the lead entity system 200, the memory device 230 includes, but is not limited to, a network server application 240 and one or more lead entity applications 250 with associated lead entity application data 252.

The lead entity applications 250 may comprise one or more applications that, when executed by the lead entity system 200, perform one or more of the process steps described herein as being conducted by the lead entity or the lead entity system 200. One example of a lead entity application 250 is an instrument booking application that is configured to communicate instructions to, and receive information from, the instrument booking engine 106 described in FIG. 1. In such embodiments, the lead entity application data 252 may comprise stored or received information or data associated with a received instrument request and/or historical instrument request data (e.g., criteria associated with historical instrument request data that can be used by a machine learning algorithm to identify potential supporting entities for a newly received instrument request). Similarly, examples of the lead entity applications 250 include a settlement application, a reconciliation application, and a master key application that are configured to communicate instructions to, and receive feedback from, the settlement engine 108, the reconciliation engine 110, and the master key engine 112, respectively.

In some embodiments, a lead entity application 250 may comprise a multi-lateral private messaging application that is configured to establish communication capabilities, transmit messages, and receive and decode messages from one or more entities. In such embodiments, the lead entity application data 252 may comprise data for Internet multi-part message formatting of messages, encryption data, decryption data, symmetric key generation data, asymmetric encryption data, and public key or blockchain address data for each entity that is taking part in a messaging event.

The lead entity applications 250 may also include a currency backed cryptocurrency application configured to associate at least a portion of a cryptocurrency with a cash or other currency-backed value, such that the currency-backed cryptocurrency is issued and traded at the value of the paired cash or other currency. In such embodiments, the lead entity application data 252 may comprise a linkage, reference, or other connection between the at least the portion of the cryptocurrency and the value of the paired cash or other currency.

The lead entity applications 250 may also comprise a hashing application that utilizes hashing data (e.g., lead application data 252) to hash documents like contracts and publish the hashed documents in a distributed blockchain network system.

Furthermore, the lead entity applications 250 may comprise a pooled conditional contract application configured to generate and transmit pooled conditional contracts to one or more other entity systems (e.g., systems associated with supporting entities and/or a beneficiary entity), and/or to execute a transferal of transaction amounts upon a determination that a pooled conditional contract has been successfully triggered.

The computer-executable program code of the network server application 240 and the lead entity applications 250 may instruct the processing device 220 to perform certain logic, data-processing, and data-storing functions of the lead entity system 200 described herein, as well as communication functions of the lead entity system 200.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the distributed blockchain network system 400, the beneficiary entity system 102, the third party system 104, the instrument booking engine 106, the settlement engine 108, the reconciliation engine 110, the master key engine 112, the supporting entities 114, and the like. The processing device 220 is configured to use the network communication interface 210 to transmit and/or receive data and/or commands to and/or from the other devices connected to the network 150.

FIG. 3 provides a block diagram illustrating an example computing device system 300 that may be utilized, managed, or otherwise controlled by the lead entity system 200, the beneficiary entity system 102, the third party system 104, the instrument booking engine 106, the settlement engine 108, the reconciliation engine 110, the master key engine 112, the first supporting entity 116, the second supporting entity 118, the distributed blockchain network system 400, or any other system that may be engaged with the system environment 100 of FIG. 1, in accordance with embodiments of the invention. In one embodiment of the invention, the computing device system 300 is a workstation, desktop computer, laptop computer, virtual server, mobile computing device, smartphone device, a plurality of servers or computing devices, or any combination of the aforementioned.

Some embodiments of the computing device system 300 include a processor 310 communicably coupled to such devices as a memory 320, user output devices 336, user input devices 340, a network interface 360, a power source 315, a clock or other timer 350, and a camera 380. The processor 310, and other processors described herein, generally include circuitry for implementing communication and/or logic functions of the computing device system 300. For example, the processor 310 may include a digital signal processor device, a microprocessor device, and various analog to digital converters, digital to analog converters, and/or other support circuits. Control and signal processing functions of the computing device system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the computing device system 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless network 152. In this regard, the computing device system 300 may be configured to operate with one or more air interface standards, communication protocols, modulation types, and access types. By way of illustration, the computing device system 300 may be configured to operate in accordance with any of a number of first, second, third, and/or fourth-generation communication protocols and/or the like. For example, the computing device system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The computing device system 300 may also be configured to operate in accordance with non-cellular communication mechanisms, such as via a wireless local area network (WLAN) or other communication/data networks.

As described above, the computing device system 300 has a user interface 330 that is, like other user interfaces described herein, made up of user output devices 336 and/or user input devices 340. The user output devices 336 include a display 334 (e.g., a liquid crystal display or the like) and a speaker 332 or other audio device, which are operatively coupled to the processor 310.

The user input devices 340, which allow the computing device system 300 to receive data from a user, may include any of a number of devices allowing the computing device system 300 to receive data from a user, such as a keypad, keyboard, touch-screen, touchpad, microphone, mouse, joystick, other pointer device, button, soft key, and/or other input device(s). The user interface 330 may also include a camera 380, such as a digital camera.

The computing device system 300 further includes a power source 315, such as a battery, for powering various circuits and other devices that are used to operate the computing device system 300. Embodiments of the computing device system 300 may also include a clock or other timer 350 configured to determine and, in some cases, communicate actual or relative time to the processor 310 or one or more other devices.

The computing device system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store a web browser application 322 and any number of computing device applications 321 which comprise computer-executable instructions/code executed by the processor 310 to implement the functions of the computing device system 300 and/or one or more of the process/method steps described herein. For example, the memory 320 may include such computing device applications 321 as messaging applications (e.g., multi-lateral private messaging applications), distributed blockchain network applications configured to interact with the distributed blockchain network system 400 of FIG. 1, digital signature applications, payment applications, and the like. These applications also typically instructions to a graphical user interface (GUI) on the display 334 that allows a user to interact with the computing device system 300, the lead entity system 300, and/or other devices or systems.

The memory 320 can also store any of a number of pieces of information, and data, used by the computing device system 300 and the applications and devices that make up the computing device system 300 or are in communication with the computing device system 300 to implement the functions of the computing device system 300 and/or the other systems described herein. For example, the memory 320 may include such data as public blockchain address information, private blockchain key information, digital wallet information, digital signature information, encryption data, decryption data, and the like.

Rather than utilizing a clearing house 402 system to aggregate data and information from a plurality of disparate systems 403 to generate a centralized database 401 of instrument information, account information, transaction information (e.g., transaction amounts, supporting amounts, settlement amounts, credit amounts, and the like), blockchain address information, entity information, and the like, as discussed with reference to some embodiments above and as shown in FIG. 4A, other various embodiments of the invention may use a decentralized blockchain configuration or architecture as shown in FIG. 4B in order to facilitate a rights management protocol in a blockchain distributed network. Such a decentralized blockchain configuration ensures accurate mapping of instrument or transaction data to entity systems (e.g., the lead entity system 200, the beneficiary entity system 102, the third party system 104, the first supporting entity system 116, or the second supporting entity system 118 of FIG. 1) or engines (e.g., the instrument booking engine 106, the settlement engine 108, the reconciliation engine 110, or the master key engine 112 of FIG. 1). Accordingly, a blockchain configuration may be used to maintain an accurate ledger of instrument requests, supporting entities, beneficiary entities, contribution amounts (e.g., lead contribution amounts and/or supporting contribution amounts), settlement amounts (e.g., portions of a settlement offer that are to be transferred from a beneficiary entity to a lead entity and/or one or more supporting entities), document hashes, encrypted messages, and the like, to provide validation of the stored data.

A blockchain (or "block chain") is a distributed database that maintains a list of data records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies. The data records recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the blockchain that creates a transaction can determine within a level of certainty whether the transaction can take place and become final by confirming that no conflicting transactions (i.e., the same currency unit has not already been spent) confirmed by the blockchain elsewhere.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, (e.g., when someone or an entity sends cryptocurrency to another person or entity), and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases, meets other criteria. In some blockchain systems, miners are encouraged to create blocks by a rewards structure that offers a pre-defined per-block reward and/or payments offered within the transactions validated themselves. Thus, when a miner successfully validates a transaction on the blockchain, the miner may receive rewards and/or payments as an encouragement to continue creating new blocks. While the term "transaction" is used herein to refer to a transfer between two parties that is recorded to be blockchain, it should be noted that the transaction data is not restricted to financial transactions, but instead can incorporate any communication, data entry, messaging entry, hashed document entry, and the like.

As mentioned above and referring to FIG. 4B, a distributed blockchain network system 400 is typically decentralized—meaning that a distributed ledger 420 (i.e., a decentralized ledger) is maintained on multiple nodes 410 of the distributed blockchain network system 400. One node 410 in the blockchain may have a complete or partial copy of the entire distributed ledger 420 or set of transactions and/or blocks on the blockchain. Transactions are initiated at a node 410 of a blockchain and communicated to the various other nodes 410 of the blockchain. Any of the nodes 410 can validate a transaction, add the transaction to its copy of the blockchain distributed ledger 420, and/or broadcast the transaction, its validation (in the form of a block) and/or other data to other nodes 410. This other data may include time-stamping, such as is used in cryptocurrency blockchains.

Various other specific-purpose implementations of blockchains have been developed. These include distributed domain name management, decentralized crowd-funding, synchronous/asynchronous communication, decentralized real-time ride sharing and even a general purpose deployment of decentralized applications.

FIG. 5 illustrates one system environment 500 that has been used in the past to secure and execute instruments. As shown in FIG. 5, the lead entity system 502 is a central system that interacts in a one-to-one manner between the beneficiary entity system 504, the third party system 506, the first supporting entity system 508, the second supporting entity system 510, the settlement system 512, and the reconciliation system 514. As such, a heavy burden is placed on the lead entity system to perform each action necessary to set up an instrument (e.g., collect supporting contribution amounts and allocating a lead contribution amount to meet an instrument amount requested by the beneficiary entity system 504).

This heavy burden includes requesting and receiving the first supporting contribution amount from the first supporting entity system 508 and storing the first supporting contribution amount in the reconciliation system until the requested instrument amount has been met; requesting and receiving the second supporting contribution amount from the second supporting entity system 510 and storing it in the reconciliation system 514; withdrawing the contribution amounts from the reconciliation system 514 when the requested instrument amount has been met; and transferring the requested instrument amount to the beneficiary entity system 504.

This process is time and resource intensive, often taking multiple days to be accomplished. During the required multiple day time period, the first supporting entity, the second supporting entity, the beneficiary entity, and/or the third party may decide to not go through with the instrument (or the transaction associated with the instrument). In such cases, the lead entity system 502 would be stuck with the task of identifying which funds had already been allocated or transferred to the lead entity system 502 for the requested instrument, break down the total funds sitting in the reconciliation system 514 by the entity that provided the funds, and return the funds to the appropriate entities. This time spend managing and transferring funds is detrimental to the time value of the funds because these funds are simply sitting idly and/or being returned without interest instead of being applied to an instrument that could provide a much higher return on the investment.

Additionally, under this system environment 500, the lead entity system 502 is burdened with keeping the accurate records of all communication, contracts, transactions, transferred funds, settlement information, and the like, for all parties to the system. Furthermore, each other entity (e.g., the beneficiary entity, the third party, the first supporting entity, and the second supporting entity) can keep their own records but are not able to see an accurate representation of the progress of the overall transaction (e.g., for generating and securing a financial instrument) without receiving a communication from the lead entity or without receiving access to the lead entity's record books.

FIG. 6 provides one embodiment of a system environment 600 that is designed to reduce the centralized nature of the role the lead entity plays, which in turn significantly reduces the amount of time that is required to execute the overall transaction (e.g., to generate and secure a financial instrument). As shown in FIG. 6, a distributed blockchain network system environment 600 is provided such that the lead entity system 602 manages a lead entity node 610, the beneficiary entity system 604 manages a beneficiary entity node 620, the third party system 606 manages a third party node 622, the first supporting entity of the supporting entities 608 manages a first supporting entity node 624, and the second supporting entity of the supporting entities 608 manages a second supporting entity node 626. As described above with respect to FIG. 5B, each node 610, 620, 622, 624, and 626 of the distributed blockchain network system environment 600 is linked together and has its own copy of an overall distributed ledger that can be compared and verified against the distributed ledgers of other nodes.

In addition to the lead entity node 610, the lead entity system 602 manages or otherwise controls or accesses the key management engine 612, the settlement engine 614, the reconciliation engine 61, and the instrument booking engine 618. In this way, the lead entity system 602 is able to perform one or more actions with its engines 612, 614, 616, and 618 and publish data associated with those actions to the distributed block network at the lead entity node 610. The other nodes 620, 622, 624, and 626 can then add any newly published information to their distributed ledger to maintain an up-to-date, real time or near real time database of information related to the overall transaction.

The system environment 600 of FIG. 6 allows the lead entity system 602 to transmit messages between itself and other entities (e.g., the beneficiary entity system 604, the third party system 606, or the supporting entities 608) by publishing encrypted messages to the blockchain network that can only be decoded by parties that hold (or know) public key address information. This messaging system is described in more detail with respect to FIG. 10.

The system environment 600 of FIG. 6 allows the lead entity to execute transactions from itself and from multiple supporting entities to the beneficiary entity (or vice-versa) simultaneously by publishing the executed transaction to its distributed ledger of the lead entity node 610 along with the appropriate authorizations and public blockchain address information for each entity that is party to the transaction. This transaction can occur simultaneously in direct response to a determination that a contribution amount has been collected by the lead entity system 602 and the supporting entities 608 to meet a requested instrument amount from the beneficiary entity system 604.

Each node in a blockchain network, including financial accounts associated with that node) is associated with a private key that must be used to publish new data to a block of the blockchain. Each private key is associated with a public key (or a "public address") that can be seen and used by other entities without allowing those other entities to gain control of the private key. The private key can be stored in a digital wallet by each entity that is part of the distributed blockchain network. In some embodiments, the public blockchain addresses of each entity or node are established or generated by the entity managing that node.

However, securely maintaining these private keys is a technical process that requires significant diligence and control by blockchain technology-savvy entities, which may not be representative of all entities engaging in a financial instrument generation and execution transaction. The disparate nature of having many private keys spread across the large number of entities that interact with the lead entity would be a difficult and resource-intensive process to properly maintain and manage. To resolve these issues, the lead entity may generate and manage the private and public keys of multiple entities through its key management engine 612 through a process 700 described in FIG. 7.

As shown in FIG. 7, the master key engine of the lead entity is able to execute a process 700 for generating a series of keys (including public keys or addresses) using a single "seed" or "master" key. As such, the master key engine may generate a key pair using an elliptic curve digital signature algorithm ("ECDSA") signature scheme, as shown at block 702. This step creates private key generation information 704 and public address generation information 706. As a new entity begins to interact with the lead entity in a process described herein (e.g., a new beneficiary entity requests an instrument, a new supporting entity is willing to provide a supporting contribution amount, or the like), the system can identify a unique identification number i 708 or other indicator that is exclusively associated with the new entity. This identification number may be a client number, a derivation of a client number, a randomly generated and assigned number, or the like.

With the unique identification number i 708, the master key engine can then generate a private address function, as shown in block 710 to combine the private key generation information 704 with the unique identification number i 708, thereby creating or otherwise generating a unique private key (i.e., the $i^{th}$ private key). This $i^{th}$ private key is then securely held or otherwise stored by the lead entity (e.g., within the master key engine) such that the lead entity may perform any actions that require the user of the $i^{th}$ private key. Similarly, the master key engine can generate the public address function, as shown in block 712 to combine the unique identification number i 708 with the public address generation information 706, thereby creating or otherwise generating a unique $i^{th}$ public address 716 (or public key) that can be provided to the new entity and be published to the blockchain network in certain cases, as described herein. For example, the lead entity may publish a transaction of cryptocurrency from a public address of a first supporting entity to a public address of the beneficiary entity, where the public address is published to the blockchain network as part of the indication that this transaction has occurred. In such an example, the lead entity may utilize the private key (as generated using the process 700 described herein) for each entity to actually transfer the cryptocurrency between the respective entities, but the private key information would remain hidden from the published blockchain database. With the ECDSA master key, the lead entity is able to generate multiple private keys dynamically and deterministically without worrying about securing each private key.

Referring now to FIG. 8, a flowchart is provided to illustrate one embodiment of a process 800 for executing, securing, and non-repudiation of pooled conditional smart contracts over a distributed blockchain network, in accordance with embodiments of the invention. In some embodiments, the process 800 may include block 802, where the system receives an instrument request comprising an instrument amount from a beneficiary entity. As used herein, the term "instrument" may refer to a financial instrument such as a loan, business loan, investment instrument, or any agreement between an entity (e.g., a financial institution) and a beneficiary entity that will provide the beneficiary with an amount of funds that can be returned at a later date for a designated amount (e.g., a settlement amount). The instrument amount is the amount that is being provided to the beneficiary entity.

In some embodiments, the system establishes a multi-lateral private messaging system for communication between the lead entity and the beneficiary entity which allows the lead entity and the beneficiary entity to securely communicate between each other. An example structure 1000 of a multi-lateral private messaging system between the lead entity and the beneficiary entity is illustrated in FIG. 10. Establishing and messaging on the multi-lateral private messaging system may comprise generating a random symmetric key 1012, encrypting a message 1010 using the random symmetric key 1012, encrypting the random symmetric key 1012 using a public key of the lead entity 1016, and encrypting the random symmetric key using a public key of the beneficiary entity 1014. The system may then package the random symmetric key-encrypted message 1008, the public key of the lead entity-encrypted random symmetric key 1006, and the public key of the beneficiary entity-encrypted random symmetric key 1004 into a message envelope 1002. This packaging may be executed using an Internet multi-part messaging format like RFC 6854. Next, the system may publish the packaged message envelope 1002 to a blockchain network. Once published, the only entities that can unpack and read the message are those with the appropriate keys which, in the example shown on FIG. 10, would be the entities holding the public key of the beneficiary entity 1014 and the entities holding the public key of the lead entity. For example, the beneficiary entity can use the public key of the beneficiary entity 1004 to decrypt the random symmetric key 1012, and use the decrypted random symmetric key 1012 to decrypt the message 1010.

In this way, the system can receive the instrument request as the message via the multi-lateral private messaging system. This multi-lateral private messaging system can be utilized in any step described herein to convey information, contracts, requests, and the like between two or more entities. By providing an automated mechanism to effectively exchange contractual information to multiple other entities using the blockchain network, without using potentially non-secure channels like email messaging or phone calls, the system is improving on traditional communication techniques for structuring, generating, and executing instruments.

In some embodiments, the process 800 includes block 804, where the system identifies a lead contribution amount that a lead entity is willing to provide to meet a portion of the instrument amount. The lead entity could choose to provide all of the necessary funding to meet the instrument amount, but good industry practice is to distribute the contribution burden across multiple supporting entities (e.g., other financial institutions). As such, the lead entity can determine how much it is willing to contribute as a lead contribution amount to fund a portion of the requested instrument amount. This step may be completed at a time after at least some supporting contribution amounts have been accounted for, or to meet any remaining demand for the instrument amount after supporting contribution amounts have been accounted for.

The lead entity may additionally set an expected settlement amount or settlement amount portion that the lead entity expects to receive from the beneficiary entity at the end of the term of the instrument. For example, the lead entity may set an interest rate for the entire instrument amount and/or for the portion of the instrument amount that is provided by the lead entity (i.e., the lead contribution amount).

Additionally, in some embodiments, the process 800 includes block 806, where the system identifies a set of supporting entities willing to provide supporting contribution amounts to meet the instrument amount. As noted above, distributing the contribution obligations for meeting the instrument amount is a good industry practice as it mitigates the chance of a major unsuccessful investment in the instrument by the lead entity and the supporting entities. The supporting entities, as mentioned above, may be financial institutions themselves, or any entity or individual that is prepared to contribute a portion of the funds necessary to meet the requested instrument amount.

To identify these supporting entities, the system may have a list of known supporting entities that may be interested in contributing to the instrument amount (or interested in contributing to any instrument). The system can then message one or more of these known supporting entities (e.g., via the multi-lateral private messaging system described with respect to FIG. 10) to offer the opportunity to contribute a portion of the requested instrument amount. These requests can include an offered interest rate or other amounts that each supporting entity can expect to receive as a settlement amount portion at a particular future point in time. The expected settlement amount portion for each individual supporting entity may vary, and may be less than the settlement amount (or settlement interest rate) of the lead entity, particularly when the lead entity is performing any administrative or negotiation tasks to generate or execute the instrument. The supporting entities that respond with an affirmation are identified as being within the set of supporting entities willing to provide supporting contribution amounts to meet the instrument amount.

The system may, in some embodiments, utilize a machine learning instrument booking engine within the system, or instruct a machine learning engine that is in the network of the system, to make the determination of which supporting entities should be included (or should receive offers to be included) in making contributions to the instrument amount. In such embodiments, the system may compare (or instruct a separate machine learning instrument booking engine) to compare a set of components of the received instrument request to a database of previous instrument request components and associated supporting entities using, using machine learning algorithms to determine best matches for which possible supporting entities should be included in the set of supporting entities. The analyzed previous set of components may comprise, but are not limited to, tenures or terms of previously requested instruments, instrument amounts (total contribution requirements) of the previously requested instruments, time of year of the previously requested instruments, names of beneficiary entities associated with the previously requested instruments, beneficiary entity types associated with the previously requested instruments, or settlement rates associated with the previously requested instruments.

The process 800 may also include block 808, where the system transmits a conditional contract to each supporting entity (i.e., a first supporting entity, a second supporting entity, and so on until the "N$^{th}$" supporting entity). Again, this transmittal may be completed using the blockchain network using a multi-lateral private messaging system like the one described with respect to FIG. 10. The conditional contract generally states the obligations and benefits of a supporting entity in participating in contributing to the instrument. For example, a conditional contract may state that the supporting entity is authorizing the lead entity to transfer a specific contribution amount from a digital wallet blockchain address of the supporting entity to the beneficiary entity only upon the condition that enough contribution amounts have been accounted for such that the transaction amount is met. In this way, no funds are actually transferred from a supporting entity until all funds are ready and accounted for. This relieves the burden on the lead entity of receiving multiple contribution amounts at different times and potentially being required to reconcile the contributions when the beneficiary entity decides to not enter into the instrument. The conditional contract may also include a provision regarding what each supporting entity can expect in terms of a settlement amount, or the amount that is paid back on the instrument. For example, the conditional contract may include an interest amount, a flat additional amount, and/or any other additional amount that a supporting entity can expect to receive once the beneficiary repays the instrument.

In some embodiments, the digital wallet blockchain addresses of each entity (e.g., the lead entity, the first supporting entity, the second supporting entity, and the like) are generated by the lead entity or a managing entity system in the manner described with respect to FIG. 7. For example, the digital wallet blockchain address (or public key) of the first supporting entity may be generated by the system when the system first generates a key pair of public address generation information and of a private master seed key using an elliptic curve digital signature algorithm. Next, the system identifies a unique customer identification number associated with the first supporting entity. The system may then generate a unique individual private key for the first supporting entity by combining the private master seed key with the customer identification number associated with the first supporting entity. Finally, the system may generate the digital wallet blockchain address of the first supporting entity by combining the public address generation information with the customer identification number associated with the first supporting entity.

Once a digital contract has been generated, the system can undertake a non-repudiation process to allow any entity to confirm that the version of the contract that it holds was in fact issued by the lead entity and is the most up-to-date version of the contract. For example, with the conditional contract that was sent to the first entity, the system may generate a digital fingerprint or hash of the conditional contract that was transmitted to the first supporting entity. The system can then publish the digital fingerprint or hash of the conditional contract transmitted to the first supporting entity to a blockchain network. If, subsequently, the system receives a notification of a repudiation of a document purporting to be the conditional contract transmitted to the first supporting entity, the system can generate a digital fingerprint or hash of that document purporting to be the conditional contract transmitted to the first supporting entity. The system can then compare the digital fingerprint or hash of the document purporting to be the conditional contract transmitted to the first supporting entity to the digital fingerprint or hash of the conditional contract transmitted to the first supporting entity that is published to the blockchain network. If the system determines that the comparison does not match, the system will reject the new document purporting to be the conditional contract transmitted to the first supporting entity, as the new document is not identical to the actual document that it purports to be. Alternatively, if the system determines that the comparison does math, the system can verify or validate the new document as being the actual conditional contract transmitted to the first supporting entity. In this way, the system is able to reject any contract repudiation claims by showing the authenticity and agreed-upon nature of the contract as hashed and published to a blockchain network that does not allow for the deletion or alteration of data once it is published to the blockchain network.

Next, the system may receive digital signatures for each transmitted conditional contract from each respective supporting entity (i.e., the first supporting entity, the second supporting entity, and so on until the "N$^{th}$" supporting entity), as shown at block 810. While in some embodiments (and in traditional practice), contracts are delivered as documents through email or fax communication and require manual signatures and manual verification of the signatures, the system at block 810 uses an automated process of allowing each supporting entity to provide a digital signature for its respective conditional contract that can be automatically verified by the system without manual intervention. As noted above, the conditional contracts will normally authorize the lead entity to withdraw funds associated with a supporting entity or transmit funds of the supporting entity only upon the condition that enough funds have been collected.

Additionally, in some embodiments, the process 800 includes block 812, where the system determines that the lead contribution amount and the supporting contribution amounts (i.e., the contribution amounts from the first supporting entity, the second supporting entity, and so on until the "N$^{th}$" supporting entity) do meet the instrument amount, as requested by the beneficiary entity.

Once this determination has been made, the process 800 may continue to block 814, where the system transfers contribution amounts from digital wallet blockchain addresses of each of the lead entity, the first supporting entity, the second supporting entity, and so on until the "N$^{th}$" supporting entity to a digital wallet blockchain address of the beneficiary entity. In embodiments where the supporting entities have control of their private key information, and where the lead entity does not have access to the private key information, the system can instruct the supporting entity to effectuate the transfer of that entity's supporting contribution amount to the beneficiary entity. However, as described above with respect to FIG. 7, the system may have access to or ownership of the private key associated with each debit address of the supporting entities. In such embodiments, the system can perform the transfer of cryptocurrencies from each of those supporting entities, using the appropriate private key.

In some embodiments, transferring the contribution amounts (e.g., the lead entity amount, the first supporting contribution amount, the second supporting contribution amount, and the like) comprises transferring a currency-backed cryptocurrency amount. This currency-backed cryptocurrency amount may be a cryptocoin or a portion of a cryptocoin that has been issued as being backed by a specific value-based item like cash that has a set value and is not traded on an open market. To issue a currency-backed cryptocoin, a consortium of entities (e.g., financial institutions) that will be using the currency-backed cryptocoin must have an agreed-upon value in place for the value of the currency-backed cryptocoin, and any entity holding the currency-backed cryptocoin must be able to sell that currency-backed cryptocoin for the agreed-upon value. Therefore, the system may determine whether a transferring and receiving party are both part of the consortium of entities that agrees on the value of the crypto-coin before transferring the currency-backed crypto-coin. If the system determines that the receiving party is not a member of the consortium, then the system can transmit an invitation to the receiving party to join the consortium, thereby agreeing to the value of the currency-backed cryptocoin before the system transfers the currency-backed cryptocoin to the receiving entity.

Furthermore, the system may publish a table to the blockchain that describes the instrument, the entities involved in the instrument, the plurality of contribution amounts associated with the instrument, the duration of the instrument amount, and the settlement amounts for each entity. One example of this table is provided in FIG. 11. As shown in FIG. 11, the example table 1100 includes several columns associated with amount debited from each entity 1102, public addresses associated with where the contribution amounts were debited from 1104, total amount credited to the beneficiary entity (i.e., total instrument amount), the public address associated with the beneficiary entity to which the contribution amounts are transferred 1108, a designation as to which entity or individual signed the conditional contract 1110, and a settlement column 1112 that designates an execution date of the contracts 1114 and a duration of the instrument (e.g., in days) 1116. The settlement column 1112 provides the portions (e.g., actual amount, percentage of the total amount, or the like) of an overall settlement amount that is expected to be provided by the beneficiary entity at the end of the instrument duration period.

Referring now to FIG. 9, a flowchart is provided to illustrate one embodiment of a process 900 for transferring portions of a settlement amount from a beneficiary entity to a plurality of contributing entities over a distributed blockchain network, in accordance with embodiments of the invention. In some embodiments, the process 900 may include block 902, where the system receives an offer of a settlement amount from the beneficiary entity that is associated with the requested instrument. The settlement amount is the amount of funds that the beneficiary entity has agreed to return to the contributing entities (i.e., the lead entity and the supporting entities) as a repayment for the instrument amount. The settlement amount normally is at a value that is greater than the instrument amount, as an interest amount or other additional is applied to the original instrument amount to encourage the lead entity and the supporting entities to provide the contribution amounts to the beneficiary entity.

In response to receiving the offer of the settlement amount, the system may determine or identify settlement portions (e.g., a lead portion of the settlement amount, a first supporting portion of the settlement amount, and the like) for each entity that provided a contribution amount for the requested instrument. The system can determine which portions of the settlement amount are to be transferred to which entities (e.g., the lead entity, the first supporting entity, the second supporting entity, and the like), based on a previously-agreed upon interest rate, settlement value, or the like. The interest rate or settlement value can vary between the contributing entities, based on the pre-determined agreements each entity has with the beneficiary entity and/or the lead entity. For example, the lead entity may receive a portion of the settlement amount that is associated with a higher interest rate than a supporting entity because the lead entity provides additional services in getting the beneficiary entity's business, organizing the instrument, and searching for supporting entities to take a part in the instrument.

Next, the system may continue to block 904, where the system transfers the respective portions of the settlement amount from the digital wallet blockchain address of the beneficiary entity to the digital wallet blockchain address of the lead entity, the first supporting entity, the second supporting entity, and so on until the $N^{th}$ supporting entity. As with the transfer at block 914 of FIG. 9, the system may control or otherwise have access to the private key of the beneficiary entity, based on the key generation scheme of FIG. 7. In such embodiments, the system may transfer the appropriate portions of the settlement amount to the respective contributing entities. Again, this transfer may be in normal cryptocurrency or in a currency-backed cryptocoin.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for executing, securing, and non-repudiation of pooled conditional smart contracts over a distributed blockchain network, the system comprising:
   a memory device; and
   a processing device operatively coupled to the memory device, wherein the processing device is configured to execute computer-readable program code to:
      receive an instrument request comprising an instrument amount from a beneficiary entity;
      identify a lead contribution amount that a lead entity is willing to provide to meet the instrument amount;
      identify a set of supporting entities that are willing to provide supporting contribution amounts to meet the instrument amount, wherein the set of supporting entities comprises at least a first supporting entity willing to provide a first supporting contribution amount, and a second supporting entity willing to provide a second supporting contribution amount;
      generate a digital wallet blockchain address of the first supporting entity by performing the steps of:
         generating a key pair of public address generation information and of a private master seed key using an elliptic curve digital signature algorithm;
         identifying a customer identification number associated with the first supporting entity;
         generating a unique individual private key for the first supporting entity by combining the private master seed key with the customer identification number associated with the first supporting entity; and
         generating the digital wallet blockchain address of the first supporting entity by combining the public address generation information with the customer identification number associated with the first supporting entity;
      transmit a conditional contract to the first supporting entity, wherein the conditional contract permits the lead entity to transfer the first supporting contribution amount from the digital wallet blockchain address of the first supporting entity to a digital wallet blockchain address of the beneficiary entity only if the lead contribution amount and the supporting contribution amounts meet the instrument amount, and only after being signed by the first supporting entity;
      receive a digital signature of the first supporting entity for the conditional contract transmitted to the first supporting entity;

transmit a conditional contract to the second supporting entity, wherein the conditional contract permits the lead entity to transfer the second supporting contribution amount from a digital wallet blockchain address of the second supporting entity to the digital wallet blockchain address of the beneficiary entity only if the lead contribution amount and the supporting contribution amounts meet the instrument amount, and only after being signed by the second supporting entity;

receive a digital signature of the second supporting entity for the conditional contract transmitted to the second supporting entity;

determine that the instrument amount has been met by determining that a combination of the lead contribution amount, the first supporting contribution amount, and the second supporting contribution amount meet the instrument amount;

in response to (a) determining that the instrument amount has been met, (b) receiving the digital signature of the first supporting entity, and (c) receiving the digital signature of the second supporting entity, transfer (x) the lead contribution amount from a digital wallet blockchain address of the lead entity to the digital wallet blockchain address of the beneficiary entity, (y) the first supporting contribution amount from the digital wallet blockchain address of the first supporting entity to the digital wallet blockchain address of the beneficiary entity, and (z) the second supporting contribution amount from the digital wallet blockchain address of the second supporting entity to the digital wallet blockchain address of the beneficiary entity;

generate a first digital fingerprint of the conditional contract transmitted to the first supporting entity;

publish the first digital fingerprint of the conditional contract transmitted to the first supporting entity to a blockchain network;

receive a notification of a repudiation of a document purporting to be the conditional contract transmitted to the first supporting entity;

generate a second digital fingerprint of the document purporting to be the conditional contract transmitted to the first supporting entity;

compare the first digital fingerprint to the second digital fingerprint; and in response to determining that the comparison between the first digital fingerprint with the second digital fingerprint does not match, reject the document purporting to be the conditional contract transmitted to the first supporting entity; or in response to determining that the comparison between the first digital fingerprint with the second digital fingerprint does match, verify the document purporting to be the conditional contract transmitted to the first supporting entity.

2. The system of claim 1, wherein the processing device is further configured to execute computer-readable program code to:

receive an offer of a settlement amount from the beneficiary entity;

transmit a lead portion of the settlement amount from the digital wallet blockchain address of the beneficiary entity to the digital wallet blockchain address of the lead entity;

transmit a first supporting portion of the settlement amount from the digital wallet blockchain address of the beneficiary entity to the digital wallet blockchain address of the first supporting entity; and transmit a second supporting portion of the settlement amount from the digital wallet blockchain address of the beneficiary entity to the digital wallet blockchain address of the second supporting entity.

3. The system of claim 1, wherein the lead contribution amount, the first supporting contribution amount, or the second supporting contribution amount comprise a currency-backed cryptocurrency amount.

4. The system of claim 1, wherein the receiving the instrument request comprises:

providing a multi-lateral private messaging system for communication between the lead entity and the beneficiary entity, wherein messaging on the multi-lateral private messaging system comprises:

generating a random symmetric key;

encrypting a message using the random symmetric key;

encrypting the random symmetric key using a public key of the lead entity and by using a public key of the beneficiary entity;

packaging the random symmetric key-encrypted message, the public key of the lead entity-encrypted random symmetric key, and the public key of the beneficiary entity-encrypted random symmetric key into a message envelope; and publishing the message envelope to a blockchain network; and receiving the instrument request as the message via the multi-lateral private messaging system.

5. The system of claim 1, wherein identifying a set of supporting entities that are willing to provide supporting contribution amounts to meet the instrument request further comprises:

comparing a set of components of the instrument request to a database of previous instrument request components and associated supporting entities using a machine learning algorithm, wherein the previous set of components comprises tenures of previously requested instruments, instrument amounts of the previously requested instruments, time of year of the previously requested instruments, names of beneficiary entities associated with the previously requested instruments, beneficiary entity types associated with the previously requested instruments, or settlement rates associated with the previously requested instruments.

6. A computer program product for executing, securing, and non-repudiation of pooled conditional smart contracts over a distributed blockchain network, the computer program product comprising at least one non-transitory computer readable medium comprising computer readable instructions, the instructions comprising instructions for:

receiving an instrument request comprising an instrument amount from a beneficiary entity;

identifying a lead contribution amount that a lead entity is willing to provide to meet the instrument amount;

identifying a set of supporting entities that are willing to provide supporting contribution amounts to meet the instrument amount, wherein the set of supporting entities comprises at least a first supporting entity willing to provide a first supporting contribution amount, and a second supporting entity willing to provide a second supporting contribution amount;

generating a digital wallet blockchain address of the first supporting entity by performing the steps of:

generating a key pair of public address generation information and of a private master seed key using an elliptic curve digital signature algorithm;

identifying a customer identification number associated with the first supporting entity;

generating a unique individual private key for the first supporting entity by combining the private master seed key with the customer identification number associated with the first supporting entity; and generating the digital wallet blockchain address of the first supporting entity by combining the public address generation information with the customer identification number associated with the first supporting entity;

transmitting a conditional contract to the first supporting entity, wherein the conditional contract permits the lead entity to transfer the first supporting contribution amount from the digital wallet blockchain address of the first supporting entity to a digital wallet blockchain address of the beneficiary entity only if the lead contribution amount and the supporting contribution amounts meet the instrument amount, and only after being signed by the first supporting entity;

receiving a digital signature of the first supporting entity for the conditional contract transmitted to the first supporting entity;

transmitting a conditional contract to the second supporting entity, wherein the conditional contract permits the lead entity to transfer the second supporting contribution amount from a digital wallet blockchain address of the second supporting entity to the digital wallet blockchain address of the beneficiary entity only if the lead contribution amount and the supporting contribution amounts meet the instrument amount, and only after being signed by the second supporting entity;

receiving a digital signature of the second supporting entity for the conditional contract transmitted to the second supporting entity;

determining that the instrument amount has been met by determining that a combination of the lead contribution amount, the first supporting contribution amount, and the second supporting contribution amount meet the instrument amount;

in response to (a) determining that the instrument amount has been met, (b) receiving the digital signature of the first supporting entity, and (c) receiving the digital signature of the second supporting entity, transferring (x) the lead contribution amount from a digital wallet blockchain address of the lead entity to the digital wallet blockchain address of the beneficiary entity, (y) the first supporting contribution amount from the digital wallet blockchain address of the first supporting entity to the digital wallet blockchain address of the beneficiary entity, and (z) the second supporting contribution amount from the digital wallet blockchain address of the second supporting entity to the digital wallet blockchain address of the beneficiary entity;

generating a first digital fingerprint of the conditional contract transmitted to the first supporting entity;

publishing the first digital fingerprint of the conditional contract transmitted to the first supporting entity to a blockchain network;

receiving a notification of a repudiation of a document purporting to be the conditional contract transmitted to the first supporting entity;

generating a second digital fingerprint of the document purporting to be the conditional contract transmitted to the first supporting entity;

comparing the first digital fingerprint to the second digital fingerprint; and in response to determining that the comparison between the first digital fingerprint with the second digital fingerprint does not match, rejecting the document purporting to be the conditional contract transmitted to the first supporting entity; or in response to determining that the comparison between the first digital fingerprint with the second digital fingerprint does match, verifying the document purporting to be the conditional contract transmitted to the first supporting entity.

7. The computer program product of claim 6, wherein the computer readable instructions further comprise instructions for:

receiving an offer of a settlement amount from the beneficiary entity;

transmitting a lead portion of the settlement amount from the digital wallet blockchain address of the beneficiary entity to the digital wallet blockchain address of the lead entity;

transmitting a first supporting portion of the settlement amount from the digital wallet blockchain address of the beneficiary entity to the digital wallet blockchain address of the first supporting entity; and transmitting a second supporting portion of the settlement amount from the digital wallet blockchain address of the beneficiary entity to the digital wallet blockchain address of the second supporting entity.

8. The computer program product of claim 6, wherein the lead contribution amount, the first supporting contribution amount, or the second supporting contribution amount comprise a currency-backed cryptocurrency amount.

9. The computer program product of claim 6, wherein the receiving the instrument request comprises:

providing a multi-lateral private messaging system for communication between the lead entity and the beneficiary entity, wherein messaging on the multi-lateral private messaging system comprises:

generating a random symmetric key;

encrypting a message using the random symmetric key;

encrypting the random symmetric key using a public key of the lead entity and by using a public key of the beneficiary entity;

packaging the random symmetric key-encrypted message, the public key of the lead entity-encrypted random symmetric key, and the public key of the beneficiary entity-encrypted random symmetric key into a message envelope; and publishing the message envelope to a blockchain network; and receiving the instrument request as the message via the multi-lateral private messaging system.

10. The computer program product of claim 6, wherein identifying a set of supporting entities that are willing to provide supporting contribution amounts to meet the instrument request further comprises:

comparing a set of components of the instrument request to a database of previous instrument request components and associated supporting entities using a machine learning algorithm, wherein the previous set of components comprises tenures of previously requested instruments, instrument amounts of the previously requested instruments, time of year of the previously requested instruments, names of beneficiary entities associated with the previously requested instruments, beneficiary entity types associated with the previously requested instruments, or settlement rates associated with the previously requested instruments.

11. A computer implemented method for executing, securing, and non-repudiation of pooled conditional smart contracts over a distributed blockchain network, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receive an instrument request comprising an instrument amount from a beneficiary entity;

identify a lead contribution amount that a lead entity is willing to provide to meet the instrument amount;

identify a set of supporting entities that are willing to provide supporting contribution amounts to meet the instrument amount, wherein the set of supporting entities comprises at least a first supporting entity willing to provide a first supporting contribution amount, and a second supporting entity willing to provide a second supporting contribution amount;

generate a digital wallet blockchain address of the first supporting entity by performing the steps of:

generating a key pair of public address generation information and of a private master seed key using an elliptic curve digital signature algorithm;

identifying a customer identification number associated with the first supporting entity;

generating a unique individual private key for the first supporting entity by combining the private master seed key with the customer identification number associated with the first supporting entity; and generating the digital wallet blockchain address of the first supporting entity by combining the public address generation information with the customer identification number associated with the first supporting entity;

transmit a conditional contract to the first supporting entity, wherein the conditional contract permits the lead entity to transfer the first supporting contribution amount from the digital wallet blockchain address of the first supporting entity to a digital wallet blockchain address of the beneficiary entity only if the lead contribution amount and the supporting contribution amounts meet the instrument amount, and only after being signed by the first supporting entity;

receive a digital signature of the first supporting entity for the conditional contract transmitted to the first supporting entity;

transmit a conditional contract to the second supporting entity, wherein the conditional contract permits the lead entity to transfer the second supporting contribution amount from a digital wallet blockchain address of the second supporting entity to the digital wallet blockchain address of the beneficiary entity only if the lead contribution amount and the supporting contribution amounts meet the instrument amount, and only after being signed by the second supporting entity;

receive a digital signature of the second supporting entity for the conditional contract transmitted to the second supporting entity;

determine that the instrument amount has been met by determining that a combination of the lead contribution amount, the first supporting contribution amount, and the second supporting contribution amount meet the instrument amount;

in response to (a) determining that the instrument amount has been met, (b) receiving the digital signature of the first supporting entity, and (c) receiving the digital signature of the second supporting entity, transfer (x) the lead contribution amount from a digital wallet blockchain address of the lead entity to the digital wallet blockchain address of the beneficiary entity, (y) the first supporting contribution amount from the digital wallet blockchain address of the first supporting entity to the digital wallet blockchain address of the beneficiary entity, and (z) the second supporting contribution amount from the digital wallet blockchain address of the second supporting entity to the digital wallet blockchain address of the beneficiary entity;

generate a first digital fingerprint of the conditional contract transmitted to the first supporting entity;

publish the first digital fingerprint of the conditional contract transmitted to the first supporting entity to a blockchain network;

receive a notification of a repudiation of a document purporting to be the conditional contract transmitted to the first supporting entity;

generate a second digital fingerprint of the document purporting to be the conditional contract transmitted to the first supporting entity;

compare the first digital fingerprint to the second digital fingerprint; and in response to determining that the comparison between the first digital fingerprint with the second digital fingerprint does not match, reject the document purporting to be the conditional contract transmitted to the first supporting entity; or in response to determining that the comparison between the first digital fingerprint with the second digital fingerprint does match, verify the document purporting to be the conditional contract transmitted to the first supporting entity.

12. The computer implemented method of claim 11, wherein when said instruction code is operated by said computer processing device, said computer processing device further performs the following operations:

receive an offer of a settlement amount from the beneficiary entity;

transmit a lead portion of the settlement amount from the digital wallet blockchain address of the beneficiary entity to the digital wallet blockchain address of the lead entity;

transmit a first supporting portion of the settlement amount from the digital wallet blockchain address of the beneficiary entity to the digital wallet blockchain address of the first supporting entity; and transmit a second supporting portion of the settlement amount from the digital wallet blockchain address of the beneficiary entity to the digital wallet blockchain address of the second supporting entity.

13. The computer implemented method of claim 11, wherein the lead contribution amount, the first supporting contribution amount, or the second supporting contribution amount comprise a currency-backed cryptocurrency amount.

14. The computer implemented method of claim 11, wherein the receiving the instrument request comprises:
providing a multi-lateral private messaging system for communication between the lead entity and the beneficiary entity,
wherein messaging on the multi-lateral private messaging system comprises:
generating a random symmetric key; encrypting a message using the random symmetric key; encrypting the random symmetric key using a public key of the lead entity; encrypting the random symmetric key using a public key of the beneficiary entity: packaging the random symmetric key-encrypted message, the public key of the lead entity-encrypted random symmetric key, and the public key of the beneficiary entity-encrypted random symmetric key into a message envelope; and publishing the message envelope to a blockchain network; and receiving the instrument request as the message via the multi-lateral private messaging system.

15. The computer implemented method of claim 11, wherein identifying a set of supporting entities that are willing to provide supporting contribution amounts to meet the instrument request further comprises:
comparing a set of components of the instrument request to a database of previous instrument request components and associated supporting entities using a machine learning algorithm, wherein the previous set of components comprises tenures of previously requested instruments, instrument amounts of the previously requested instruments, time of year of the previously requested instruments, names of beneficiary entities associated with the previously requested instruments, beneficiary entity types associated with the previously requested instruments, or settlement rates associated with the previously requested instruments.

* * * * *